United States Patent
Rathod et al.

(10) Patent No.: US 9,160,724 B2
(45) Date of Patent: Oct. 13, 2015

(54) DEVICES, SYSTEMS, AND METHODS FOR DEVICE PROVISIONING

(71) Applicant: CANON KABUSHIKI KAISHA, Toyko (JP)

(72) Inventors: Hari Rathod, Mission Viejo, CA (US); Allison Bajo, Carson, CA (US); Minoru Torii, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 132 days.

(21) Appl. No.: 14/165,046

(22) Filed: Jan. 27, 2014

(65) Prior Publication Data

US 2015/0215297 A1 Jul. 30, 2015

(51) Int. Cl.
*H04L 29/06* (2006.01)

(52) U.S. Cl.
CPC .......... *H04L 63/062* (2013.01); *H04L 63/0876* (2013.01)

(58) Field of Classification Search
CPC combination set(s) only.
See application file for complete search history.

(56) References Cited

U.S. PATENT DOCUMENTS

| | | | |
|---|---|---|---|
| 6,628,934 B2 | 9/2003 | Rosenberg | |
| 6,993,658 B1 | 1/2006 | Engberg | |
| 7,054,924 B1 | 5/2006 | Harvey | |
| 7,444,386 B2 | 10/2008 | Jensen | |
| 7,644,145 B2 | 1/2010 | Rockwell | |
| 7,720,981 B2 | 5/2010 | Nomura | |
| 7,774,477 B2 | 8/2010 | Zintel | |
| 8,131,850 B2 | 3/2012 | Kuo | |
| 8,135,808 B2 | 3/2012 | Sterling | |
| 8,141,144 B2 | 3/2012 | Good | |
| 8,171,160 B1 | 5/2012 | Ward | |
| 8,194,275 B2 | 6/2012 | Furst | |
| 8,201,237 B1 | 6/2012 | Doane | |
| 8,244,836 B2 | 8/2012 | DeHaan | |
| 8,850,551 B2 * | 9/2014 | Abe | ................. 726/9 |
| 2006/0005024 A1 | 1/2006 | Law | |
| 2006/0041755 A1 | 2/2006 | Pemmaraju | |
| 2010/0311391 A1* | 12/2010 | Siu et al. | ........ 455/411 |
| 2011/0209208 A1* | 8/2011 | Quach et al. | ...... 726/7 |
| 2013/0262317 A1* | 10/2013 | Collinge et al. | ....... 705/71 |

FOREIGN PATENT DOCUMENTS

EP 2355028 A1 8/2011

OTHER PUBLICATIONS

IBM; Tivoli Provisioning Manager for Software, Version 5.1.1.0; downloaded from http://publib.boulder.ibm.com/infocenter/tivihelp/v21r1/index.jsp?topic=°2Fcom.ibm.tivoli.tpm.sec.doc%2Fuseres°2Fcsec_twofactor.html on Oct. 24, 2012.

(Continued)

*Primary Examiner* — Beemnet Dada
(74) *Attorney, Agent, or Firm* — Canon U.S.A., Inc. IP Division

(57) ABSTRACT

Systems, devices, and methods for provisioning a device receive authentication information from a user interface; send the authentication information to an identity provider device; receive a token at the registration device from the identify provider device; send the token, device information of a new device, and a provisioning request from the registration device to a provisioning service; receive an activation code at a user interface of the new device; send the activation code and the token from the new device to the provisioning device; and receive a key from the provisioning device, the key being associated with the device identifier of the new device.

13 Claims, 22 Drawing Sheets

(56) References Cited

OTHER PUBLICATIONS

IBM Tivoli Provisioning Manager Version 7.1.1 User Guide, Jun. 2011, p. 360.
StrikeForce Technologies, Inc.; ProtectID Whitepaper; downloaded Oct. 25, 2012.
StrikeForce Technologies, Inc.; Out-of-Band Multi-Factor Authentication Cloud Services Whitepaper; downloaded Oct. 25, 2012.
Citizens First National Bank, Computer Registration for Multi-Factor Authentication, downloaded from www.citizens1st.com/computer_registration.pdf on Oct. 25, 2012.
TeleSign 2FA; http://www.telesign.com/products-demos/telesign-2fa/accessed on Nov. 2, 2012.
Bank of America, SafePass Frequently Asked Questions, downloaded Oct. 25, 2012.
Liberty Alliance Project, Liberty ID-WSF Advanced Client Technologies Overview, downloaded Oct. 24, 2012.
Liberty Alliance Project, Liberty ID-WSF Design Patterns, downloaded Oct. 24, 2012.
Liberty Alliance Project, Provisioning Liberty Advanced Clients, downloaded Oct. 24, 2012.

\* cited by examiner

870 ─┐
Printing Setup

Add a device

Use the form below to add a new device

| Device Name: | Widget |
| Serial Number: | 58fne95jkcx87w |
| IP Address: | 192.184.1.1 |
| Port Number: | 9900 |
| URL: | 26.15.84.62.800/print |
| Description | Printer |

871 ─┘

[ Add ] ─ 872

FIG. 8A

870 ─┐
Printing Setup

Successfully added Device. ─ 873
One time activation code: 94kxcme9

⚠ Device is not yet activated!

| Device Name: | Widget |
| Serial Number: | 58fne95jkcx87w |
| IP Address: | 192.184.1.1 |
| Port Number: | 9900 |
| URL: | 26.15.84.62.800/print |
| Description | Printer |

871 ─┘

[ Add ] ─ 872

FIG. 8B

DEVICES, SYSTEMS, AND METHODS FOR DEVICE PROVISIONING

BACKGROUND

1. Technical Field

This description generally relates to provisioning devices.

2. Background

Many devices are equipped to provide services to users or devices over a network connection. For example, multi-function printers ("MFPs") may implement web servers and may be able to communicate with remote users via an intranet or even the Internet. Additionally, devices are often configured to operate in a certain environment (e.g., network settings, user permissions, device relationships). Device provisioning prepares a device to provide services to users in an environment.

SUMMARY

In one embodiment a method for provisioning a device comprises receiving authentication information from a user interface at a registration device, wherein the authentication information corresponds to a user; sending the authentication information from the registration device to an identity provider device; receiving a token at the registration device from the identify provider device, wherein the token corresponds to the user; sending the token, device information of a new device, and a provisioning request from the registration device to a provisioning service; at a user interface of the new device, receiving an activation code; sending the activation code and the token from the new device to the provisioning device; and at the new device, receiving a key from the provisioning device, wherein the key is associated with the device identifier of the new device.

In one embodiment, one or more computer-readable media store instructions that, when executed by one or more computing devices, cause the one or more computing devices to perform operations comprising receiving authentication information from a user interface at a registration device, wherein the authentication information corresponds to a user; sending the authentication information from the registration device to an identity provider device; receiving a token at the registration device from the identify provider device, wherein the token corresponds to the user; sending the token, device information of a new device, and a first provisioning request from the registration device to a provisioning service; at a user interface of the new device, receiving an activation code; sending the activation code and the token from the new device to the provisioning device; and at the new device, receiving a key from the provisioning device, wherein the key is associated with the device identifier of the new device.

In one embodiment, a system for provisioning a device comprises one or more computer-readable media; one or more communication interfaces; and one or more processors configured to cause the system to receive authentication information from a user interface at a registration device, wherein the authentication information corresponds to a user; send the authentication information from the registration device to an identity provider device; receive a token at the registration device from the identify provider device, wherein the token corresponds to the user; send the token, device information of a new device, and a provisioning request from the registration device to a provisioning service; at a user interface of the new device, receive an activation code; send the activation code and the token from the new device to the provisioning device; and at the new device, receive a key from the provisioning device, wherein the key is associated with the device identifier of the new device.

BRIEF DESCRIPTION OF THE DRAWINGS

FIG. 8A and FIG. 8B illustrate example embodiments of administrator user interfaces.

DESCRIPTION

The following disclosure describes certain explanatory embodiments. Other embodiments may include alternatives, equivalents, and modifications. Additionally, the explanatory embodiments may include several novel features, and a particular feature may not be essential to some embodiments of the devices, systems, and methods described herein.

Figure 1:
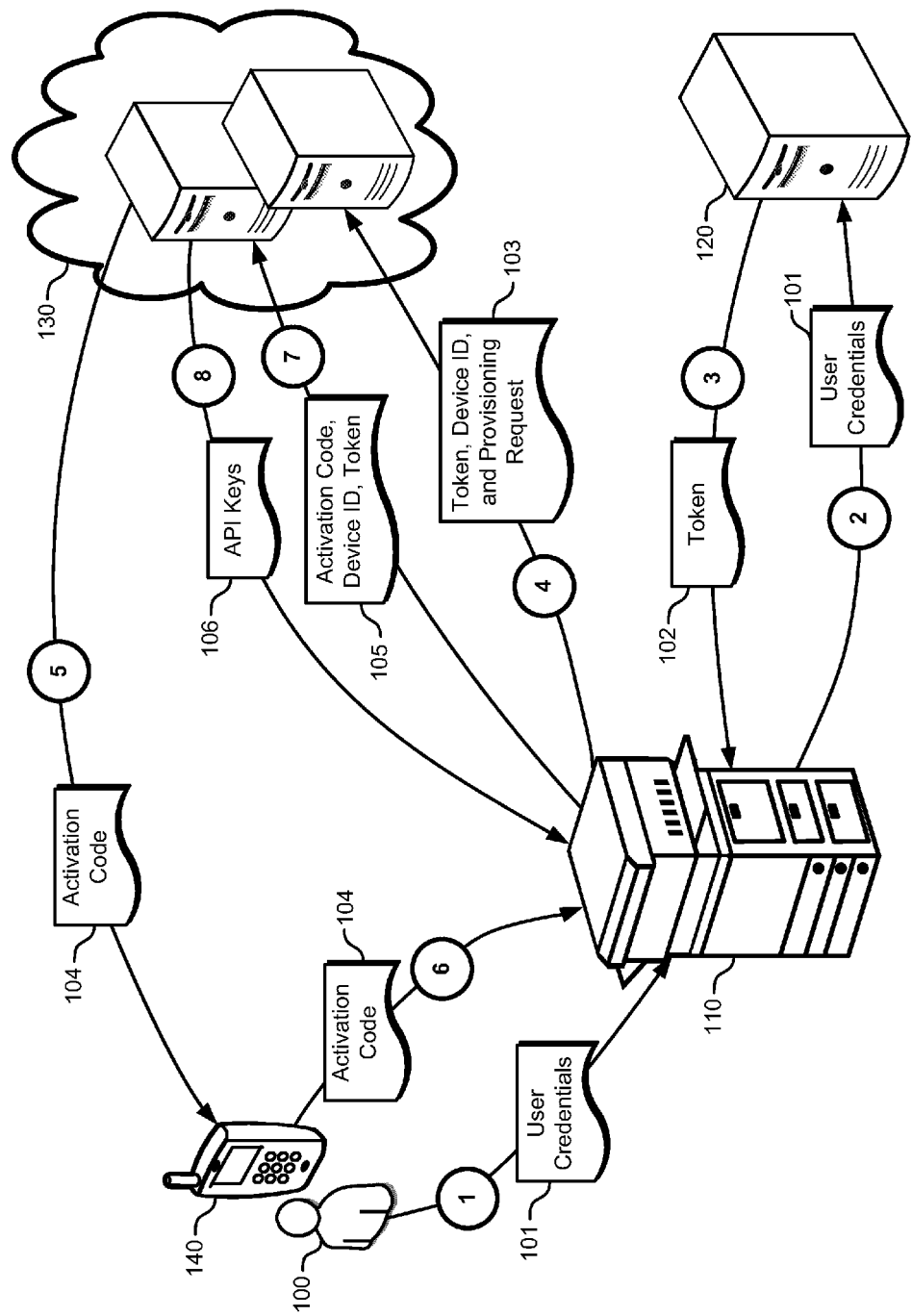
FIG. 1 illustrates an example embodiment of a system for device provisioning and an example embodiment of the flow of information in the system.

FIG. 1 illustrates an example embodiment of a system for device provisioning and an example embodiment of the flow of information in the system. In some embodiments of the system, the stages are performed in different orders than the presented order. The system includes a candidate device 110

(e.g., a multi-function printer, a scanner, a cable box, a camera); an identity-provider device 120; a provisioning service 130, which includes one or more computing devices; and a user-associated device 140. The devices communicate with each other via one or more wired or wireless networks. The candidate device 110 is configured to provide one or more services (e.g., printing, scanning, data retrieval, photographing, video recording) to other devices by means of a network connection. For example, a candidate device 110 that includes a scanner may scan a document in response to receiving a scan request from another device.

Also, the provisioning service 130 may track and use the capabilities of different devices. Provisioning may inform the provisioning service 130 of the capabilities of a candidate device 110, so that the provisioning service 130 can determine what services the candidate device 110 can perform, and may create a more secure communication channel between the provisioning service 130 and the candidate device 110.

A user 100 provides user credentials 101 to the candidate device 110 in stage 1. For example, the credentials 101 may be provided to the candidate device 110 by entering a password, a passcode, or a PIN into a user interface of some embodiments of the candidate device 110; by swiping a smart card at a card reader of some embodiments the candidate device 110; by scanning an image (e.g., a one- or two-dimensional barcode) on some embodiments of the candidate device 100; or by providing biometric information (e.g., fingerprint, face-recognition, image of a retina) to a biometric detector of some embodiments of the candidate device 100. In stage 2, the candidate device 110 sends the user credentials 101 to the identity provider device 120. The identify-provider device 120, which has a relationship of trust with the provisioning service 130, determines if the user credentials 101 are valid and determines the access rights that are associated with the user credentials 101. If the user credentials 101 are valid, then the identity-provider device 120 generates a corresponding token 102, which identifies the user 100 and which may indicate the access rights that are associated with the user credentials 101. In stage 3, the identity-provider device 120 sends the token 102 to the candidate device 110.

After receiving the token 102, in stage 4 the candidate device 110 sends a request 103 (which includes the token 102, an identifier ("ID") of the candidate device 110, and a provisioning request) to the provisioning service 130. Also, the request 103 may include additional candidate-device information. The provisioning service 130 generates an activation code 104 based on one or more of the token 102 and the ID of the candidate device 110, and the provisioning service 130 identifies the user 100 based on the token 102. Additionally, the provisioning service maintains a database of users (e.g., the user 100). The database also includes the respective user-associated devices (e.g., the user-associated device 140) of the users, the respective user-associated accounts of the users, or both. The information is previously stored in the database, for example by means of entry by an administrator. Additionally, the provisioning service 130 stores and associates the activation code 104, the token 102, and the ID of the candidate device 110, for example in a device record in the database.

In stage 5, the provisioning service 130 sends the activation code 104 to the user by means of a user-associated device 140 of the user 100 that is identified by the token 102. The activation code 104 may be sent to the user-associated device 140 by means of an account (e.g., email account, social media account, an SMS account) that is associated with the user or may be sent to a specific device (e.g., portable digital assistant, customized tablet) that is associated with the user 100. The user-associated device 140 may be, for example, a portable computing device, such as a laptop, a smart phone, a tablet computer, and a personal digital assistant. Also, the activation code 104 may be valid for only a predetermined, limited timespan.

Next, in stage 6, the activation code 104 is transferred from the user-associated device 140 to the candidate device 110. For example, the activation code 104 can be transferred by displaying the activation code 104 on a display of the user-associated device 140 and capturing an image of the display with the candidate device 110, by wireless transmission (e.g., 802.11 wireless, Bluetooth, near-field communication), by entry of the activation code 104 into a user interface of the candidate device 110 by a user who read the activation code 104 on a display of the user-associated device, by printing the activation code 104 and capturing an image of the printout at the candidate device 110, and by means of a web server that operates on the candidate device 110 (e.g., on embodiments of the candidate device 110 that do not include a physical external user interface) and that receives the activation code 104 from another device (e.g., the user-associated device 140) that communicates with the web server.

Then, in stage 7, the candidate device 110 sends a message 105 that includes the activation code 104, the token 102, and the ID of the candidate device 110 to the provisioning service 130. The provisioning service 130 determines if the token 102, the activation code 104, and the ID of the candidate device 110 are valid. A valid token 102, a valid code 104, and a valid ID may be, for example, a token 102, an activation code 104, and an ID of a candidate device 110 that are stored by the provisioning service 130 and that are associated with each other by the provisioning service 130.

In response to receiving a message 105 that includes a valid token 102, a valid code 104, and a valid ID of the candidate device 110, in stage 8 the provisioning service 130 sends one or more API keys 106 (and, in some embodiments, an API secret) to the candidate device 110. The candidate device 110 can then use the one or more API keys 106 to communicate with the provisioning service 130.

Figure 2:
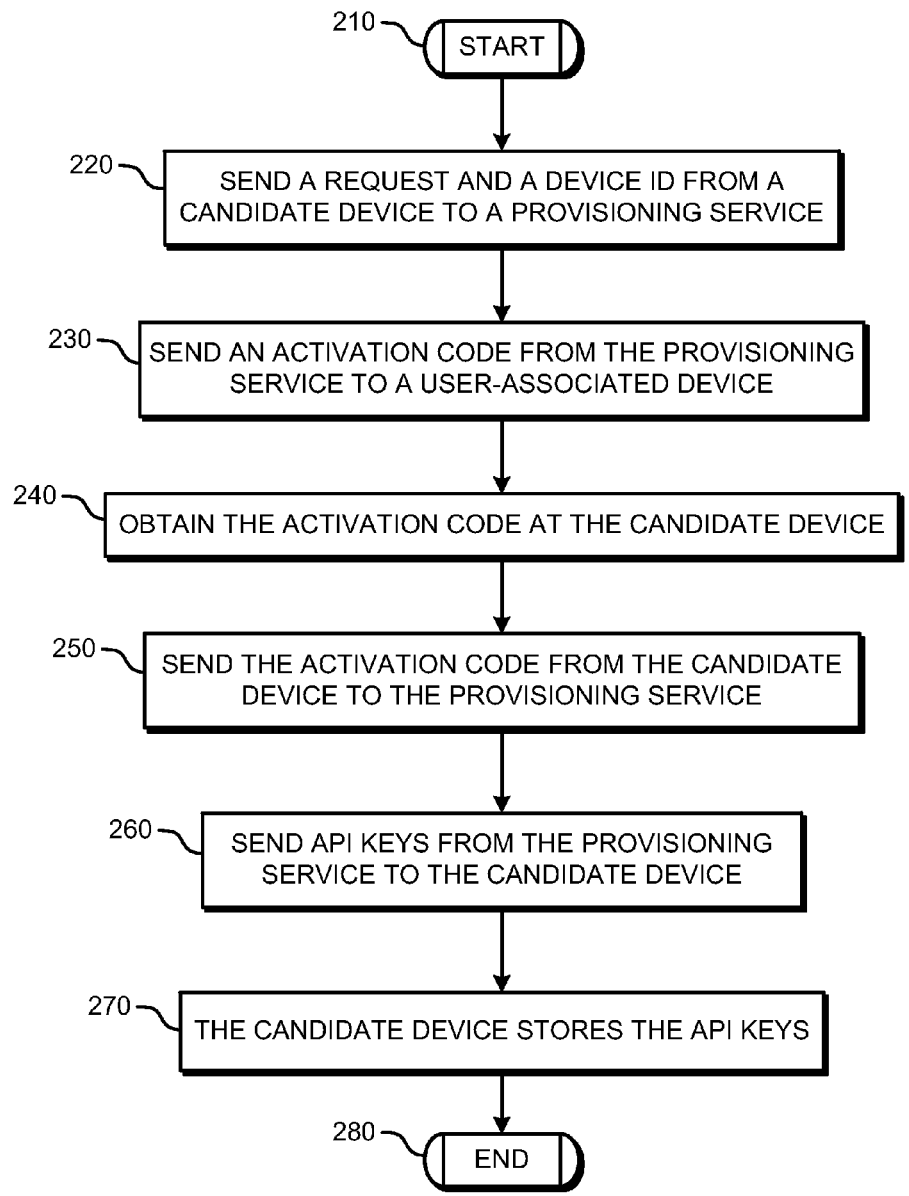
FIG. 2 illustrates an example embodiment of an operational flow for device provisioning.

FIG. 2 illustrates an example embodiment of an operational flow for device provisioning. The blocks of this operational flow and the other operational flows described herein may be performed by one or more computing devices, for example the systems and devices described herein. Also, although this operational flow and the other operational flows described herein are each presented in a certain order, some embodiments may perform at least some of the operations in different orders than the presented orders. Examples of possible different orderings include concurrent, overlapping, reordered, simultaneous, incremental, and interleaved orderings. Thus, other embodiments of this operational flow and the other operational flows described herein may omit blocks, add blocks, change the order of the blocks, combine blocks, or divide blocks into more blocks.

The flow starts in block 210 and then moves to block 220. In block 220, a request and a device ID are sent from a candidate device to a provisioning service. Also, some embodiments send other device information (e.g., IP address, serial number). Next, in block 230, an activation code is sent from the provisioning service to a user-associated device. In block 240, the candidate device obtains the activation code, for example through manual entry at a user-interface, from a network connection (either wired or wireless) with the user-associated device, or from other input means (e.g., a scanner, a camera, a smart-card reader, a USB port, an optical drive).

The flow then moves to block 250, where the activation code is sent from the candidate device to the provisioning service by means of one or more networks. Next, in block 260, one or more API keys (and, in some embodiments, an API secret) are sent from the provisioning service to the candidate device. Finally, in block 270 the candidate device stores the API keys (and, in some embodiments, the API secret), and the flow ends in block 280.

Figure 3:
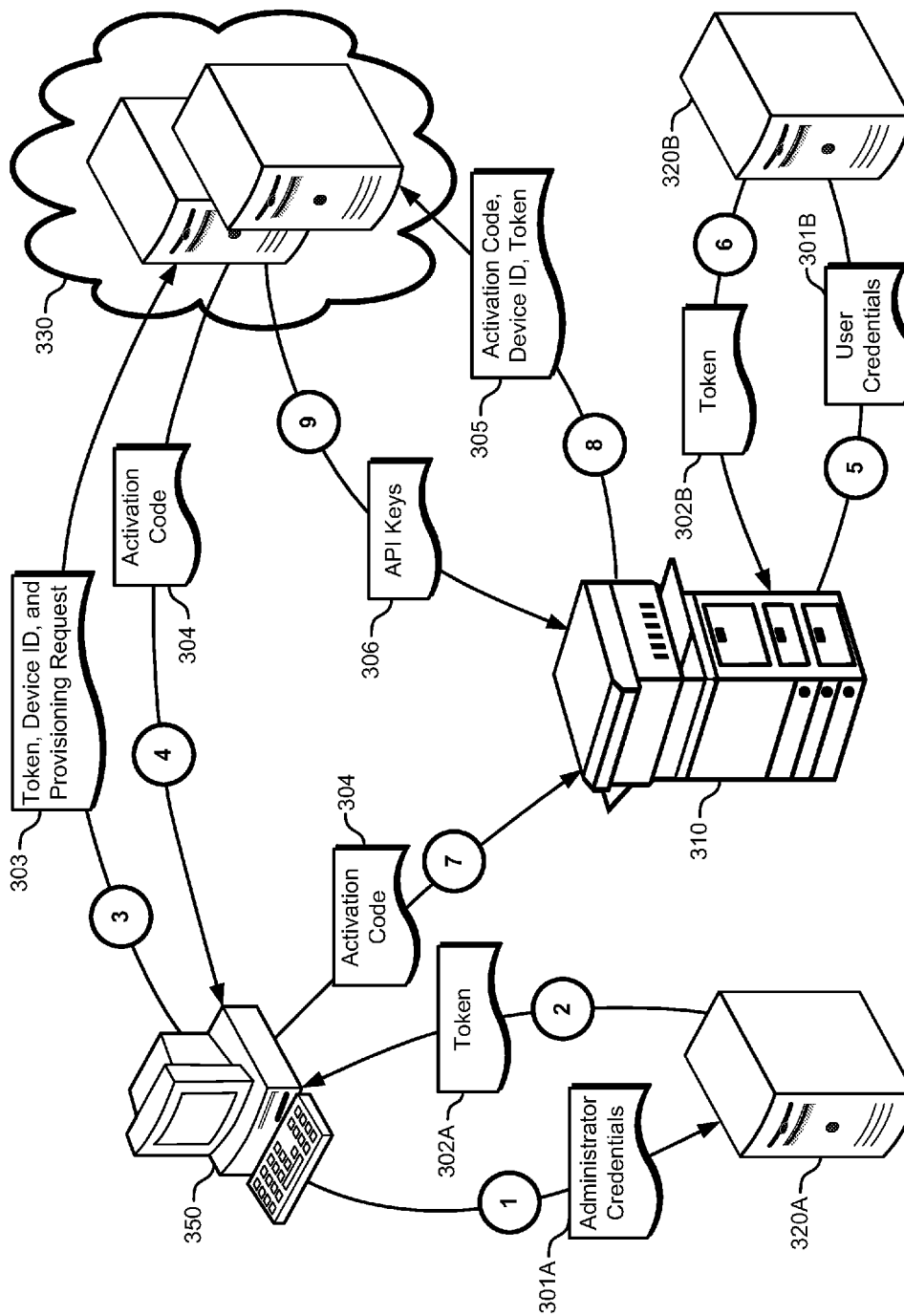
FIG. 3 illustrates an example embodiment of a system for device provisioning and an example embodiment of the flow of information in the system.

FIG. 3 illustrates an example embodiment of a system for device provisioning and an example embodiment of the flow of information in the system. The system includes a candidate device 310; two identity-provider devices 320A-B; a provisioning service 330, which includes one or more computing devices; and an administrator-associated device 350. The devices communicate with each other by means of one or more wired or wireless networks. Additionally, in some embodiments of the system, the stages are performed in different orders than the presented order.

In stage 1, the administrator device 350 sends administrator credentials 301A to a first identity-provider device 320A. In stage 2, in response to verifying the administrator credentials 301A, the first identity-provider device 320A generates and sends a first token 320A, which may indicate administrator rights and may indicate an organization of the administrator, to the administrator device 350.

After receiving the first token 302A, in stage 3 the administrator device 350 sends a request 303 to the provisioning service 330. The request 303 includes the first token 302A, an ID of the candidate device 310, and a provisioning request. In some embodiments, the request 303 includes additional device information. The provisioning service 330 generates an activation code 304 based on one or more of the first token 302A and the ID of the candidate device 310. Additionally, the provisioning service 330 maintains a database of administrators and their respective administrator devices 350. The provisioning service 330 stores and associates the activation code 304, the first token 302A, the administrator or the administrator device 350, and the ID of the candidate device 310, for example in a device record. Also, in some embodiments, the device record includes the organization (e.g., company, school, department) that is indicated by the first token 302A. In stage 4, the provisioning service 330 sends the activation code 304 to the administrator device 350.

In stage 5, user credentials 301B, which were obtained by the candidate device 310, are sent from the candidate device 310 to a second identity-provider device 320B. In response to validating the user credentials 301B, in stage 6 the identity-provider device 320B sends a second token 302 (which may also indicate an organization of the candidate device 310) to the candidate device 310.

Next, in stage 7, the activation code 304 is transferred from the administrator device 350 to the candidate device 310. Then in stage 8, the candidate device 310 sends a message 305, which includes the activation code 304, the second token 302B, and the ID of the candidate device 310, to the provisioning service 330. The provisioning service 330 determines if the second token 302B, the activation code 304, and the ID of the candidate device 310 are valid.

In response to receiving a message 305 that includes a valid second token 302B, a valid code 304, and a valid ID of the candidate device 310, in stage 9 the provisioning service 330 sends one or more API keys 306 (and, in some embodiments, an API secret) to the candidate device 310.

Figure 4:
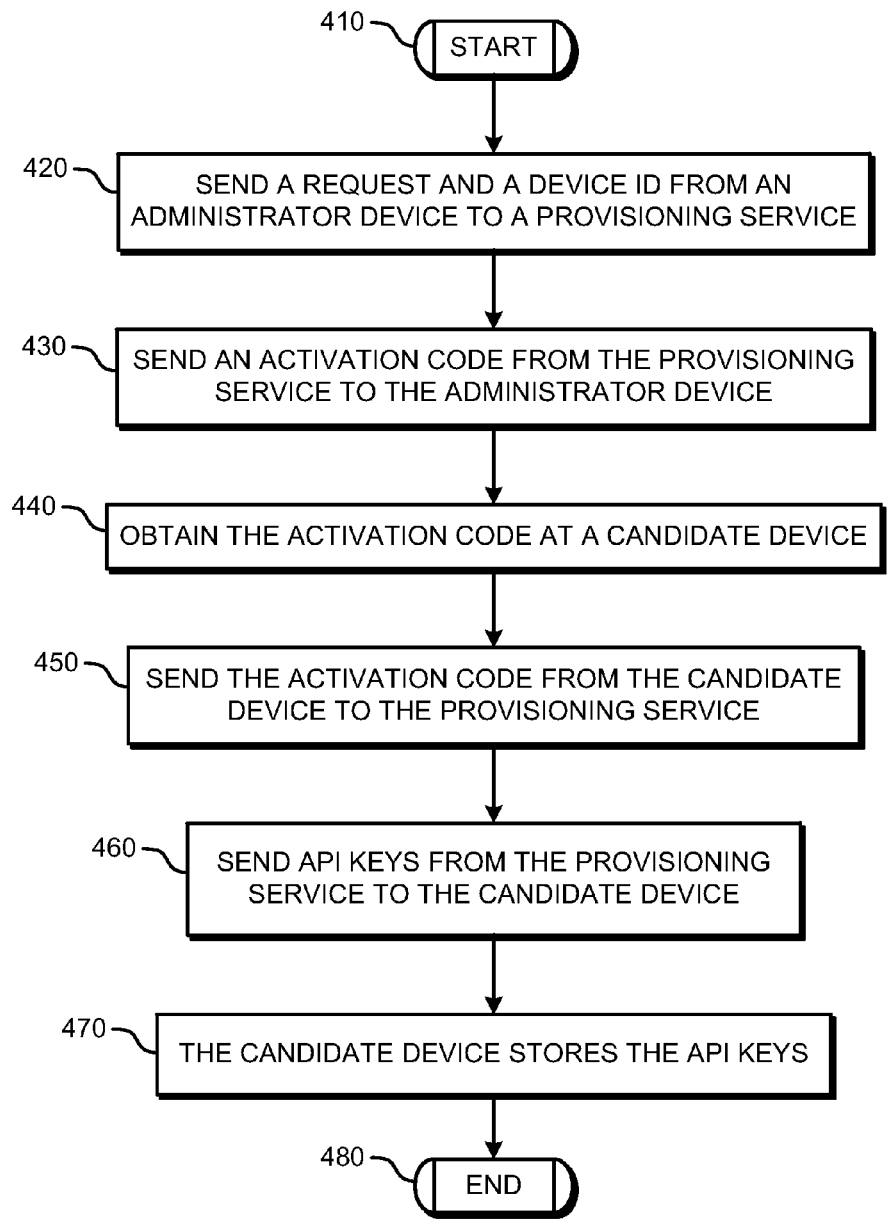
FIG. 4 illustrates an example embodiment of an operational flow for device provisioning.

FIG. 4 illustrates an example embodiment of an operational flow for device provisioning. The flow starts in block 410 and then moves to block 420. In block 420, a request and a device ID are sent from an administrator device to a provisioning service. Next, in block 430, an activation code is sent from the provisioning service to the administrator device. In block 440, a candidate device obtains the activation code, for example through manual entry at a user-interface, from a network connection (either wired or wireless) with the administrator device, or from other input means (e.g., a scanner, a camera, a smart-card reader, a USB port, an optical drive).

The flow then moves to block 450, where the activation code is sent from the candidate device to the provisioning service by means of one or more networks. Next, in block 460, one or more API keys (and, in some embodiments, an API secret) are sent from the provisioning service to the candidate device. Finally, in block 470 the candidate device stores the one or more API keys (and, in some embodiments, the API secret), and the flow ends in block 480.

Figure 5:
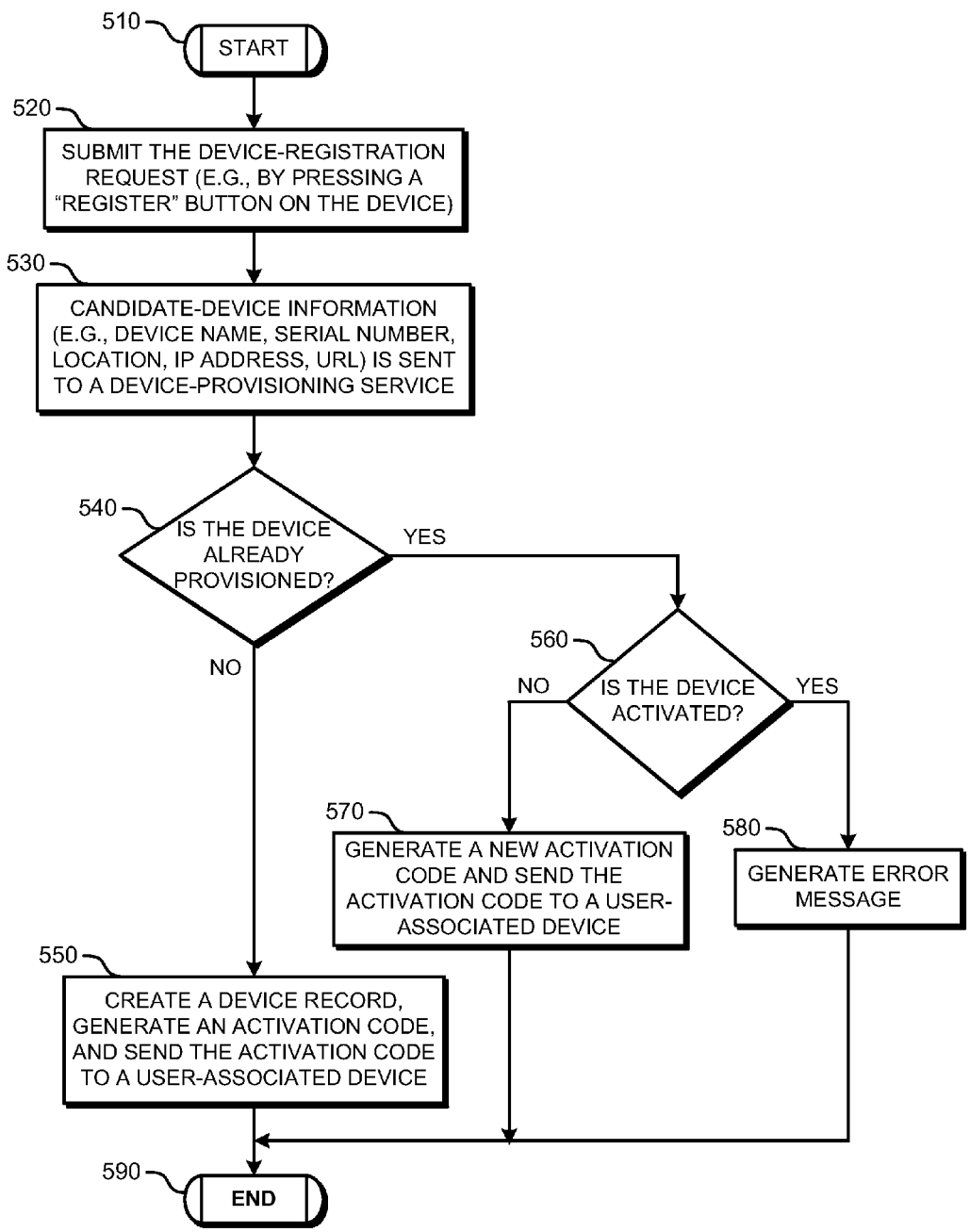
FIG. 5 illustrates an example embodiment of an operational flow for device registration.

FIG. 5 illustrates an example embodiment of an operational flow for device registration. Device registration includes generating an activation code and creating a record of a candidate device at a provisioning service. The flow starts in block 510, then moves to block 520, where a device-registration request is submitted (e.g., by pressing a "register" button on the candidate device). Next, in block 530, candidate-device information (e.g., device name, serial number, location, IP address, URL) is sent to a provisioning service.

The flow then moves to block 540, where it is determined (e.g., by the provisioning service) if the candidate device is already provisioned. If not (block 540=NO), then the flow proceeds to block 550, where a device record is created, an activation code is generated, and the activation code is sent to a user-associated device. If the candidate device is already provisioned (block 540=YES), then the flow moves to block 560, where it is determined (e.g., by the provisioning service) if the candidate device is already activated.

If in block 560 it is determined that the candidate device is not activated (block 560=NO), then the flow moves to block 570, where a new activation code is generated and the activation code is sent to a user-associated device. If in block 560 it is determined that the candidate device is activated (block 560=YES), then the flow proceeds to block 580, where an error message is generated. Finally, after blocks 550, 570, or 580, the flow proceeds to block 590, where the flow ends.

Figure 6A:
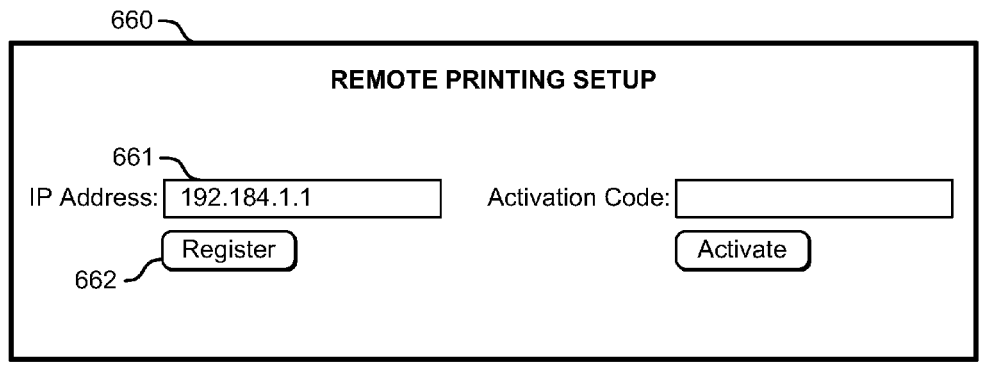
FIG. 6A and FIG. 6B illustrate example embodiments of candidate-device user interfaces.
Figure 6B:
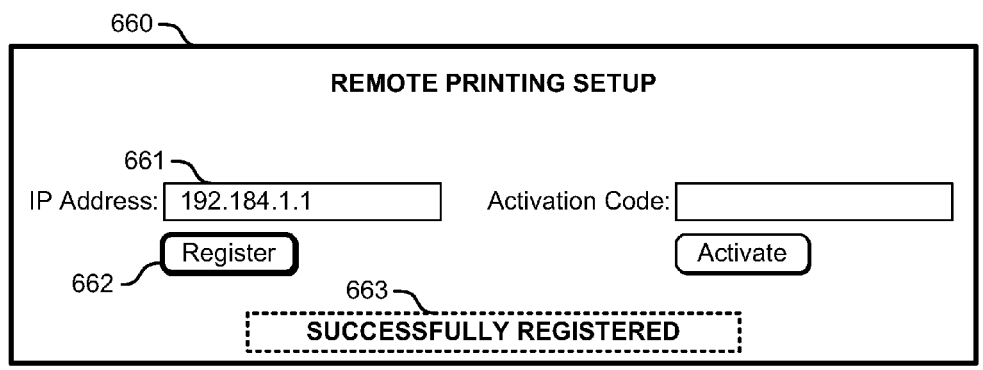

FIG. 6A and FIG. 6B illustrate example embodiments of candidate-device user interfaces. FIG. 6A illustrates a user interface 660 that includes an address field 661 for receiving an IP address and a register button 662. The register button 662 can be activated by a user to enter a command to send the IP address in the address field 661, which is the IP address of the candidate device, to a provisioning service (e.g., to perform the operations in blocks 520 and 530 of FIG. 5). FIG. 6B illustrates a user interface 660 that shows an activated register button 662 and a response message 663, which indicates that registration was successful.

Figure 7:
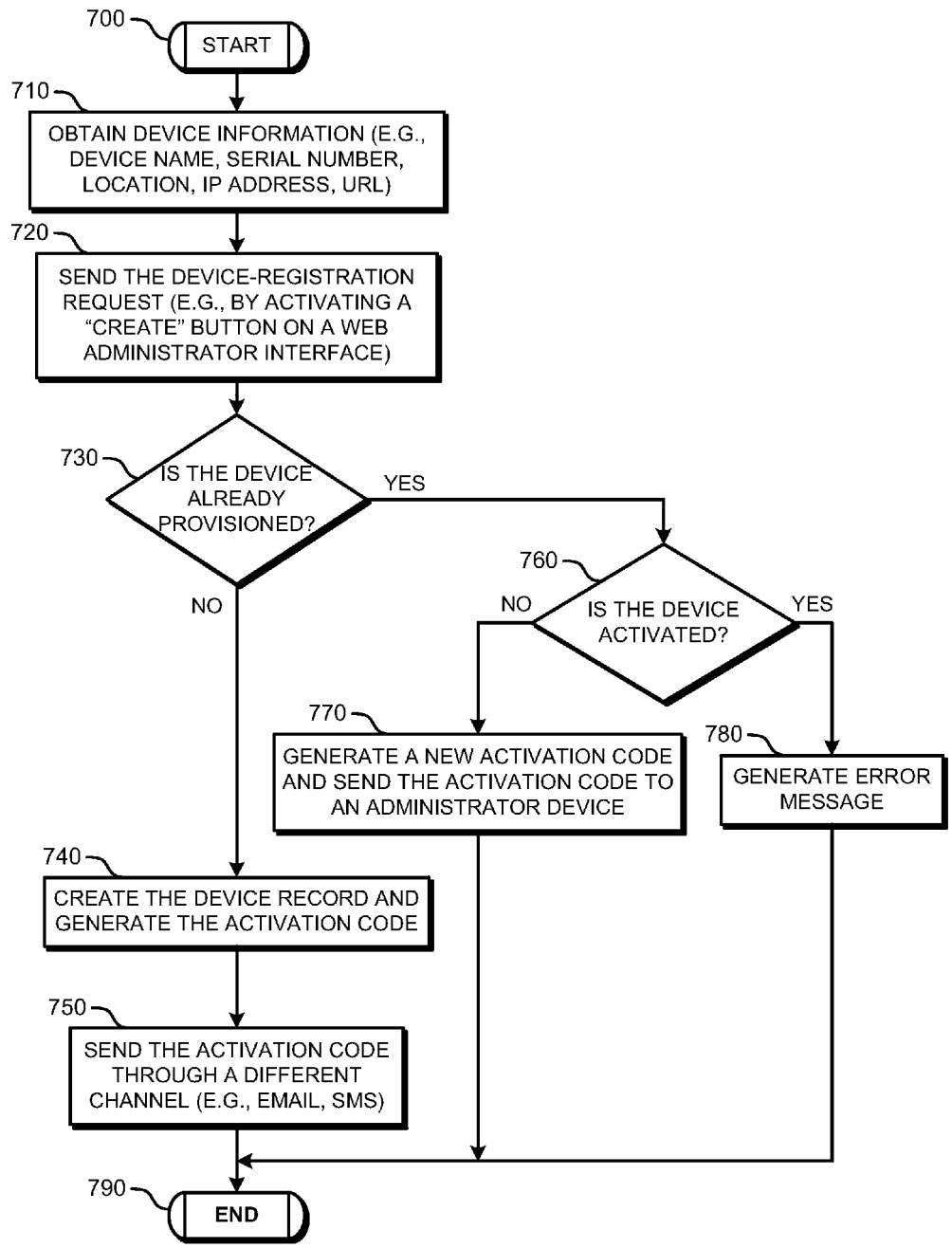
FIG. 7 illustrates an example embodiment of an operational flow for device registration.

FIG. 7 illustrates an example embodiment of an operational flow for device registration. The flow starts in block 700 and then moves to block 710, where device information (e.g., device name, serial number, location, IP address, URL) for a candidate device is obtained. Next, in block 720, a device-registration request, which includes the device information, is sent to a provisioning service.

The flow then moves to block 730, where it is determined (e.g., by the provisioning service) if the candidate device is already provisioned. If not (block 730=NO), then the flow proceeds to block 740, where a device record is created and an activation code is generated. From block 740, the flow moves to block 750, where the activation code is sent to the administrator through a different channel (e.g., email, SMS) than the channel that was used to send the device-registration request, and then to block 790, where the flow ends.

If in block 730 it is determined that the candidate device is already provisioned (block 730=YES), then the flow moves to block 760, where it is determined (e.g., by the provisioning service) if the candidate device is already activated. If in block 760 it is determined that the candidate device is not activated (block 760=NO), then the flow moves to block 770, where a new activation code is generated and the activation code is sent to an administrator device, and then to block 790, where the flow ends. If in block 760 it is determined that the candidate device is activated (block 760=YES), then the flow proceeds to block 780, where an error message is generated, and then the flow proceeds to block 790, where the flow ends.

FIG. 8A and FIG. 8B illustrate example embodiments of administrator user interfaces. FIG. 8A illustrates a user interface 870 that includes a form 871 that includes fields that accept device information for a candidate device. The user interface 870 also includes an add button 872, which can be activated to enter a command to send a device-registration request, which includes the device information in the form 871, to a provisioning service (e.g., to perform the operations in block 720 FIG. 7). FIG. 8B illustrates a user interface 870 that includes an activated add button 872 and an activation code 873 that was received in response to the transmission of the device-registration request.

Figure 9:
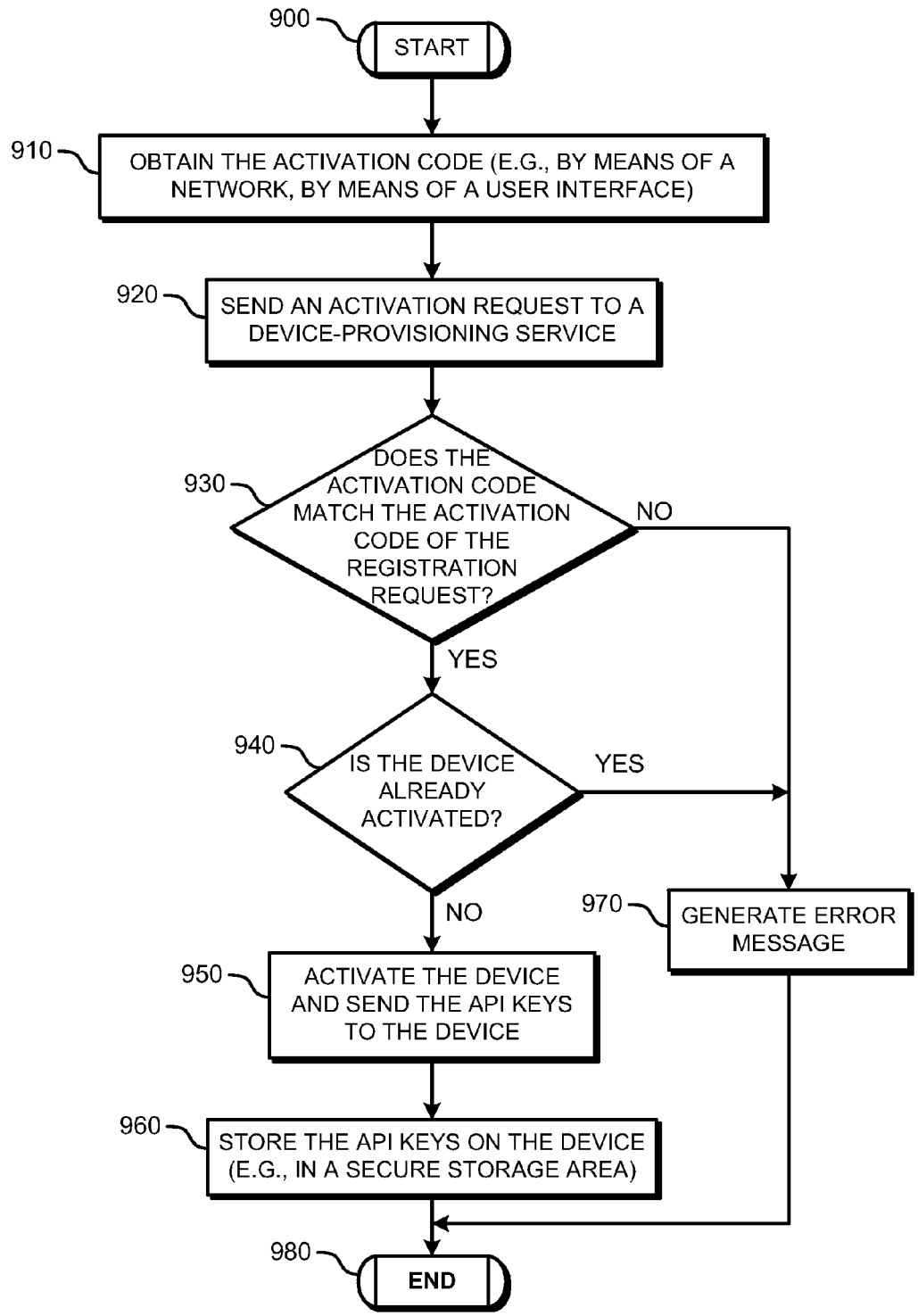
FIG. 9 illustrates an example embodiment of an operational flow for device activation.

FIG. 9 illustrates an example embodiment of an operational flow for device activation. The flow starts in block 900, and then moves to block 910, where an activation code is obtained by a candidate device (e.g., by means of a network, by means of a user interface). Next, in block 920, an activation request, which includes the activation code and the ID of the candidate device, is sent to a provisioning service. The flow then moves to block 930, where it is determined (e.g., by the provisioning service) if the activation code that is stored by the provisioning service matches the activation code of the received device-registration request for the candidate device. If the activation code matches (block 930=YES), then the flow moves to block 940. If in block 930 the activation code is determined not to match (block 930=NO), then the flow moves to block 970, where an error message is generated.

In block 940, it is determined if the candidate device is already activated. If the candidate device is determined to already be activated (block 940=YES), then the flow moves to block 970, where an error message is generated. After block 970, the flow proceeds to block 980, where the flow ends. If in block 940 the candidate device is determined to not already be activated (block 940=NO), then the flow moves to block 950.

In block 950, one or more API keys (and, in some embodiments, an API secret) are sent to the candidate device, and the status of the candidate device is changed to activated. Finally, in block 960 the API keys are stored on the candidate device (e.g., in a secure storage area), and then the flow ends in block 980.

Figure 10A:
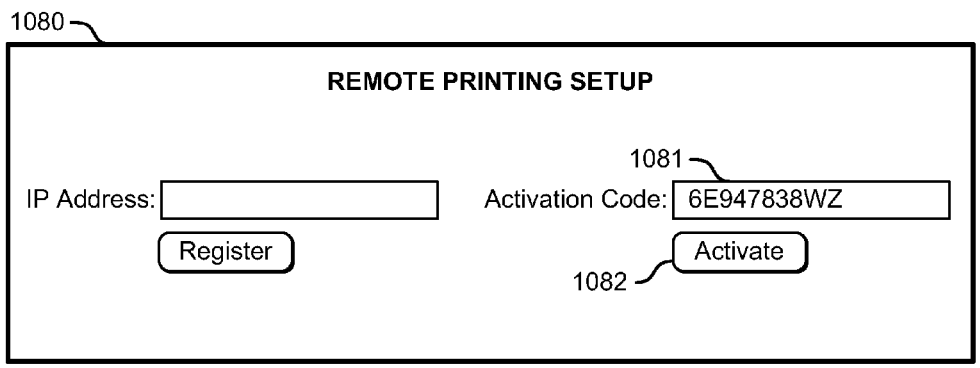
FIG. 10A and FIG. 10B illustrate example embodiments of candidate-device user interfaces.
Figure 10B:
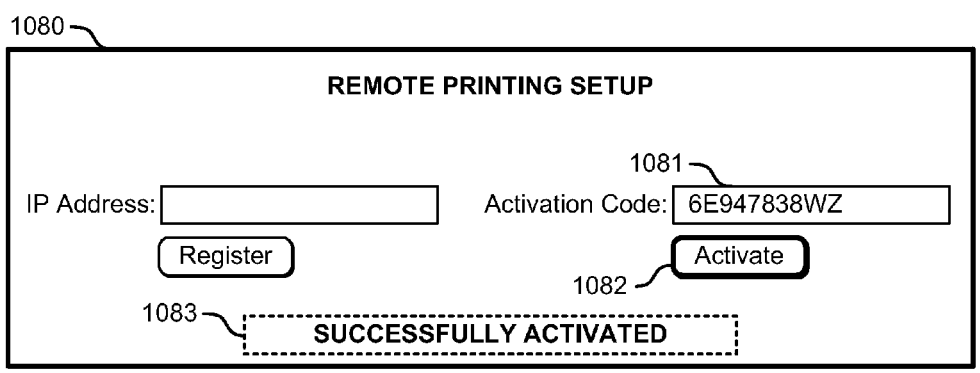

FIG. 10A and FIG. 10B illustrate example embodiments of candidate-device user interfaces. FIG. 10A illustrates a user interface 1080 that includes an activation-code field 1081 for receiving an activation code and an activate button 1082. The activate button 1082 can be activated to enter a command to send the activation code in the activation-code field 1081 to a provisioning service (e.g., to perform the operations in blocks 910 and 920 of FIG. 9). FIG. 10B illustrates a user interface 1080 that shows an activated activate button 1082 and a response message 1083, which indicates that activation was successful.

Figure 11:
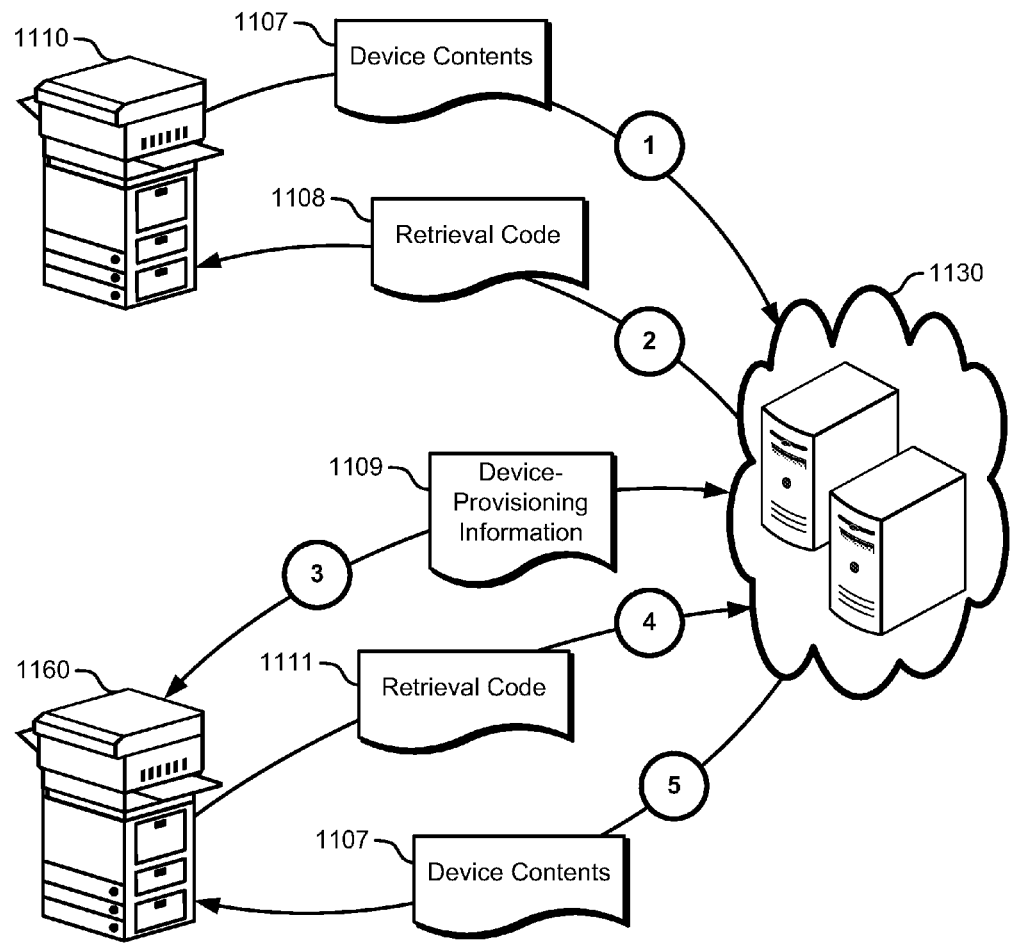
FIG. 11 illustrates an example embodiment of a system for device replacement and an example embodiment of the flow of information in the system.

FIG. 11 illustrates an example embodiment of a system for device replacement and an example embodiment of the flow of information in the system. The system includes a previously-provisioned device 1110 (e.g., a candidate device that has been registered and activated), a provisioning service 1130, and a new device 1160. In stage 1, the previously-provisioned device 1110 sends its device contents 1107 (e.g., device information, device-configuration details, device applications, address books) to the provisioning service 1130. The provisioning service 1130 stores the received device contents 1107 and generates a retrieval code 1108, which is associated with the device contents 1107. In stage 2, the provisioning service 1130 sends the retrieval code 1108 to the previously-provisioned device 1110. In stage 3, the new device 1160 and the provisioning service 1130 exchange device-provisioning information 1109 (e.g., a token, an activation code, a request, a device ID, an API key) to provision (e.g., register and activate) the new device 1160. Then, in stage 4, the new device obtains the retrieval code 1111 (e.g., by means of manual entry at a user interface, of a card reader, of a scanner, of a network connection) and sends the retrieval code 1111 to the provisioning service 1130. In stage 5, the provisioning service 1130 identifies the device contents 1107 based on the retrieval code 1111 and sends the device contents 1107 to the new device 1160. The new device 1160 then stores the device contents 1107, configures itself according to any received device-configuration details, and activates any received applications.

Figure 12:
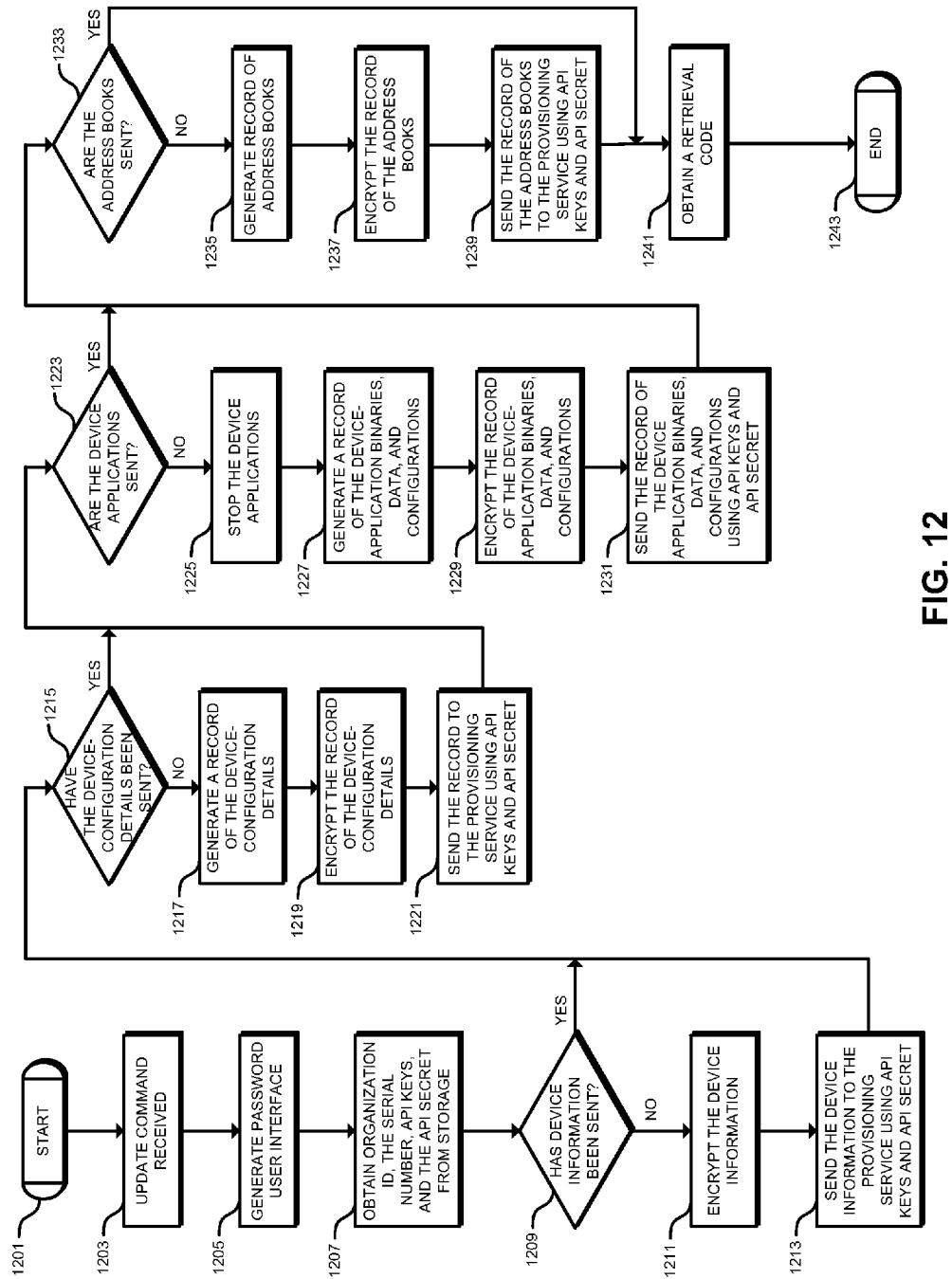
FIG. 12 illustrates an example embodiment of an operational flow for device replacement.

FIG. 12 illustrates an example embodiment of an operational flow for device replacement. The flow starts in block 1201, and then moves to block 1203, where an update command is received by a previously-provisioned device. The flow moves to block 1205, where the previously-provisioned device generates a user interface that is configured to prompt a user for, and accept, a password. Next, in block 1207, the previously-provisioned device obtains and creates a record (e.g., a file) that includes the device information, for example by retrieving the device information from internal storage and generating a record that includes the information. The device information may include one or more of the following: an organization identifier ("organization ID"), one or more API keys, a serial number, an API secret, a device name, a firmware version, and a device location.

The flow then moves to block 1209, where it is determined (e.g., by the previously-provisioned device, by the provisioning service) if the device information has already been sent. If the device information has been sent (block 1209=YES), then the flow proceeds to block 1215. If not (block 1209=NO), then the flow moves to block 1211. In block 1211, the record of the device information is encrypted using the password that was obtained in block 1205, and in block 1213, the record of the device information is sent to a provisioning service using the one or more API keys, the API secret, or both. The flow then proceeds to block 1215.

In block 1215, it is determined (e.g., by the previously-provisioned device, by the provisioning service) if the device-configuration details (which may include, for example, default print settings, scan settings, PDL settings, copy settings, and network settings) of the previously-provisioned device have been sent to the provisioning service. If the configuration details have been sent (block 1215=YES), then the flow moves to block 1223. If not (block 1215=NO), then the flow moves to block 1217, where a record of the device-configuration details is generated. Next, in block 1219, the record of the device-configuration details is encrypted, and in block 1221 the record of the device-configuration details is sent to the provisioning service using the one or more API keys, the API secret, or both. The flow then proceeds to block 1223.

In block 1223, it is determined (e.g., by the previously-provisioned device, by the provisioning service) if the device applications, which are the applications that are installed on the previously-provisioned device, have been sent to the provisioning service. If the device applications have been sent (block 1223=YES), then the flow moves to block 1233. If not (block 1223=NO), then the flow moves to block 1225, where execution of the device applications is stopped. Next, in block 1227, a record that includes the device-application binary files, data, and configurations is generated, and in block 1229 the record of the device-application binary files, data, and configurations is encrypted. Then in block 1231, the record of the device-application binary files, data, and configurations is sent to the provisioning service using the one or more API keys, the API secret, or both. The flow then moves to block 1233.

In block 1233, it is determined (e.g., by the previously-provisioned device, by the provisioning service) if the address books (which may include, for example, mail addresses, phone numbers, email addresses, personal information, and privacy information) that are stored on the previously-provisioned device have been sent to the provisioning service. If the address books have been sent (block 1233=YES), then the flow moves to block 1241. If not (block 1233=NO), then the flow moves to block 1235, where a record that includes the address books is generated. Next, in block 1237, the record of the address books is encrypted, and in block 1239 the record of the address books is sent to the provisioning service using the one or more API keys, the API secret, or both. The flow then proceeds to block 1241, where a retrieval code is obtained (e.g., after being generated by the provisioning service), and finally the flow ends in block 1243.

Figure 13A:
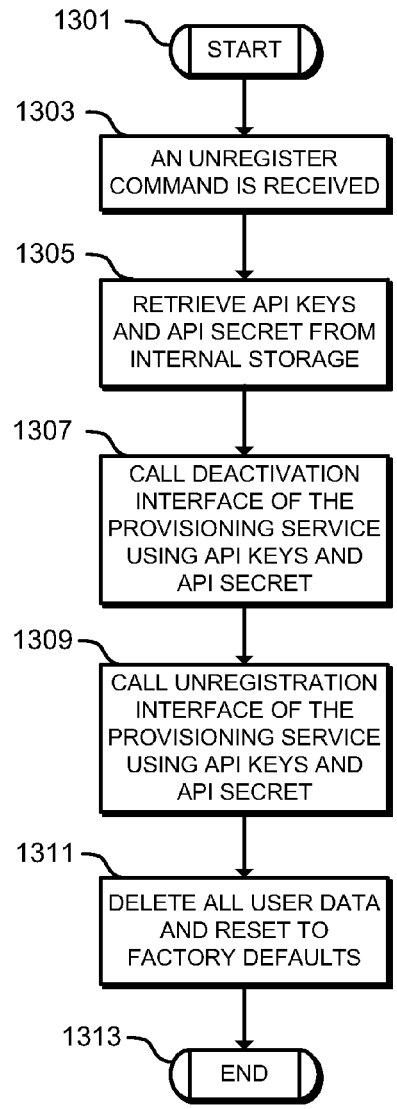
FIG. 13A and FIG. 13B illustrate example embodiments of operational flows for device replacement.
Figure 13B:
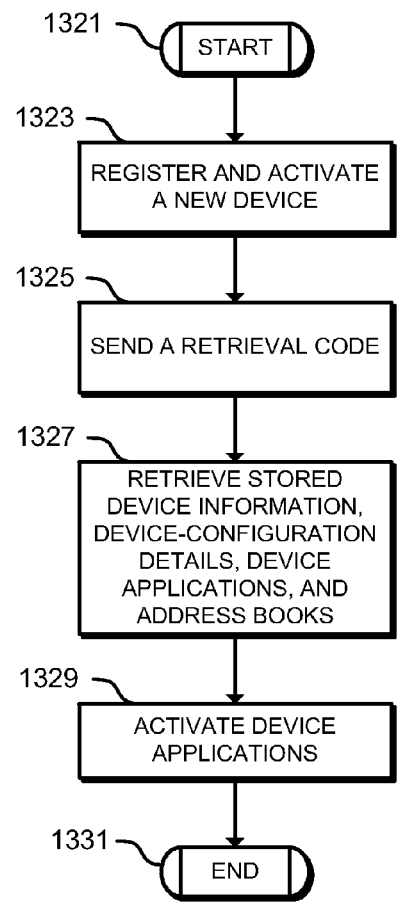

FIG. 13A and FIG. 13B illustrate example embodiments of operational flows for device replacement. The operational flow in FIG. 13A starts in block 1301 and then moves to block 1303. In block 1303, an unregister command is received by a previously-provisioned device. Next, in block 1305, the one or more API keys and the API secret are retrieved from internal storage, and in block 1307, a deactivation interface of the provisioning service is called using the one or more API keys and the API secret. Following, in block 1309, an unregistration interface of the provisioning service is called using the one or more API keys and the API secret. Finally, in block 1311 all user data is deleted and the settings of the previously-provisioned device are reset to the factory defaults, and the flow ends in block 1313.

The operational flow in FIG. 13B starts in block 1321 and then moves to block 1323, where a new device is registered and activated. Next, in block 1325, a retrieval code is sent to a provisioning service. Following, in block 1327, one or more of the following are retrieved from the provisioning service by the new device: the device information, the device configuration details, the device applications, and the address books of a previously-provisioned device. Next, in block 1329, the device applications are activated, and then the flow ends in block 1331.

Figure 14:
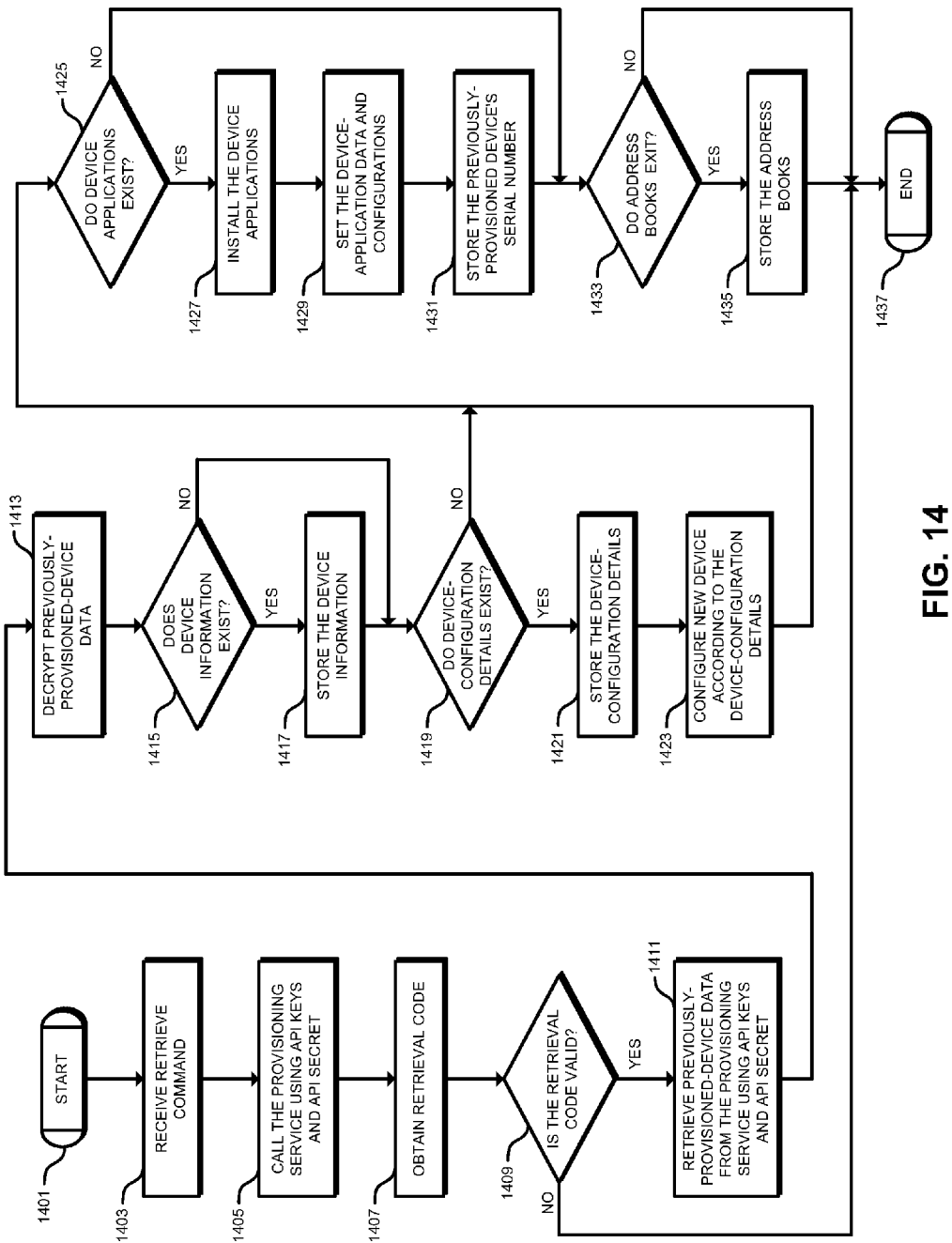
FIG. 14 illustrates an example embodiment of an operational flow for device replacement.

FIG. 14 illustrates an example embodiment of an operational flow for device replacement. The operations in the operational flow of FIG. 14 may be performed, for example, in block 1325 and block 1327 of FIG. 13B. The flow starts in block 1401, and then in block 1403 a retrieve command is received by a new device. Next, in block 1405, the new device calls a provisioning service using one or more API keys, an API secret, or both (the API keys, the API secret, or both were previously received by the new device during device provisioning (e.g., according to FIGS. 1-4)). The flow moves to block 1407, where the new device obtains a retrieval code (e.g., by means of user entry on a user interface, by means of a network interface, by means of a USB port). Next, in block 1409, it is determined if the retrieval code is valid, for example by sending the retrieval code to the provisioning service and receiving a reply that indicates valid or invalid. If the retrieval code is determined to not be valid (block 1409=NO), then the flow moves to block 1437, where the flow ends. If the retrieval code is determined to be valid (block 1409=YES), then the flow moves to block 1411. In block 1411, previously-provisioned-device data is retrieved from the provisioning service using the one or more API keys, the API secret, or both. Next, in block 1413, the previously-provisioned-device data is decrypted by the new device.

The flow then moves to block 1415, where it is determined if the previously-provisioned-device data includes device information. If not (block 1415=NO), then the flow moves to block 1419. If yes (block 1415=YES), then the flow moves to block 1417, where the new device stores the device information, and then the flow proceeds to block 1419.

The flow then moves to block 1419, where it is determined if the previously-provisioned-device data includes device-configuration details. If not (block 1419=NO), then the flow moves to block 1425. If yes (block 1419=YES), then the flow moves to block 1421, where the new device stores the device information. Following, in block 1423, the new device configures itself according to the device-configuration details.

The flow then proceeds to block 1425, where it is determined if the previously-provisioned-device data includes device applications. If not (block 1425=NO), then the flow moves to block 1433. If yes (block 1425=YES), then the flow moves to block 1427, where the new device installs the device applications. Next, in block 1429, the new device sets the device-application data and device-application configurations. Following, in block 1431, the new device stores the previously-provisioned device's serial number (e.g., for use when activating the device applications).

The flow then moves to block 1433, where it is determined if the previously-provisioned-device data includes one or more address books. If not (block 1433=NO), then the flow moves to block 1437. If yes (block 1433=YES), then the flow moves to block 1435, where the new device stores the one or more address books. Finally, the flow ends in block 1437.

Figure 15:
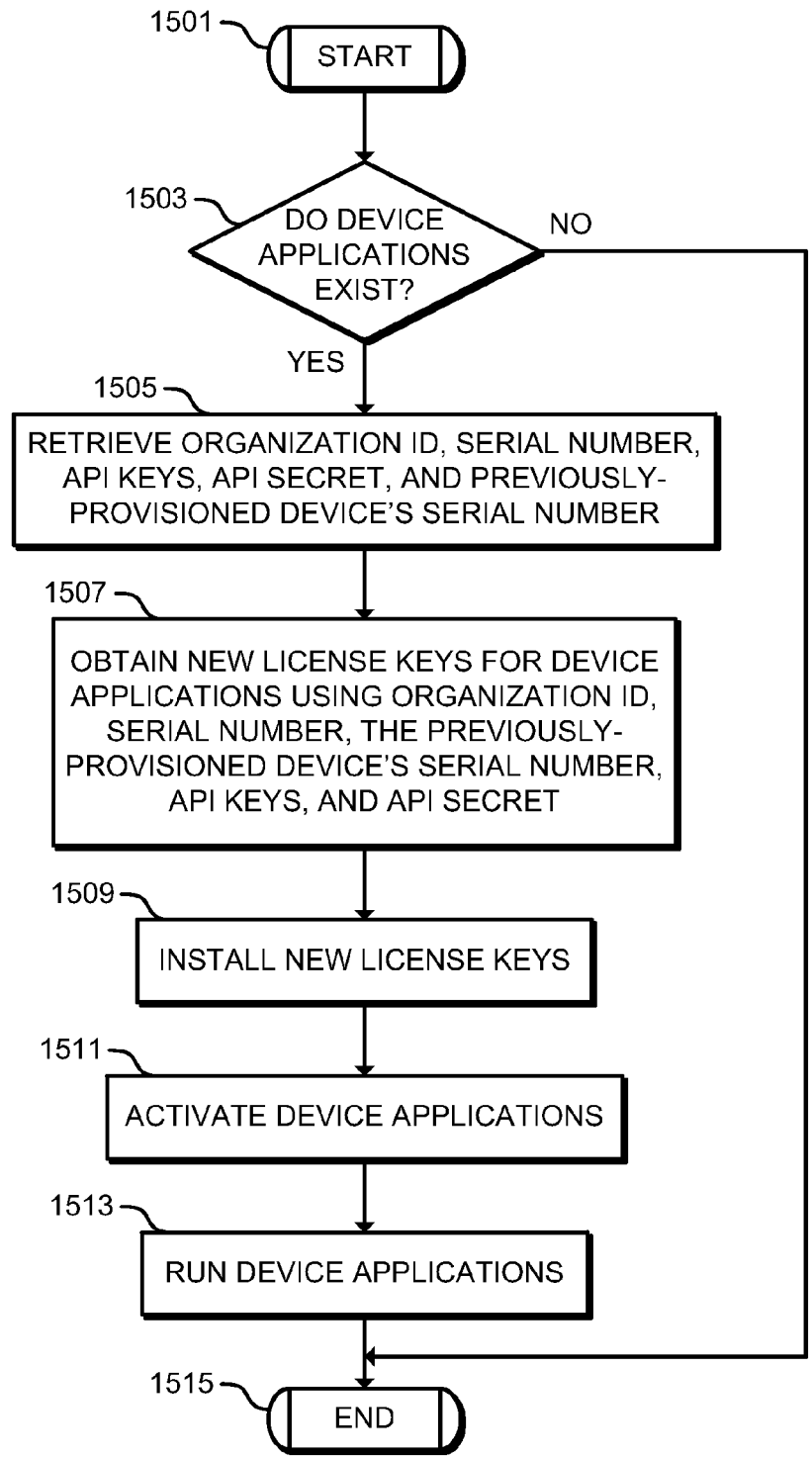
FIG. 15 illustrates an example embodiment of an operational flow for device replacement.

FIG. 15 illustrates an example embodiment of an operational flow for device replacement. The flow starts in block 1501 and then proceeds to block 1503, where it is determined (e.g., by a new device) if previously-provisioned-data includes device applications. If not (block 1503=NO), then the flow moves to block 1515, where the flow ends. If yes (block 1503=YES), then the flow moves to block 1505. In block 1505, the new device retrieves its serial number, the serial number of the previously-provisioned device, the one or more API keys, the API secret, and the organization ID from storage and then, in block 1507, obtains new license keys for the device applications (e.g., by means of the provisioning service) using its serial number, the serial number of the previously-provisioned device, the one or more API keys, the API secret, and the organization ID.

Next, in block 1509, the new device installs the new license keys, and in block 1511 the new device activates the device applications. The flow then moves to block 1513, where the new device starts running the device applications. Finally, the flow ends in block 1515.

Figure 16:
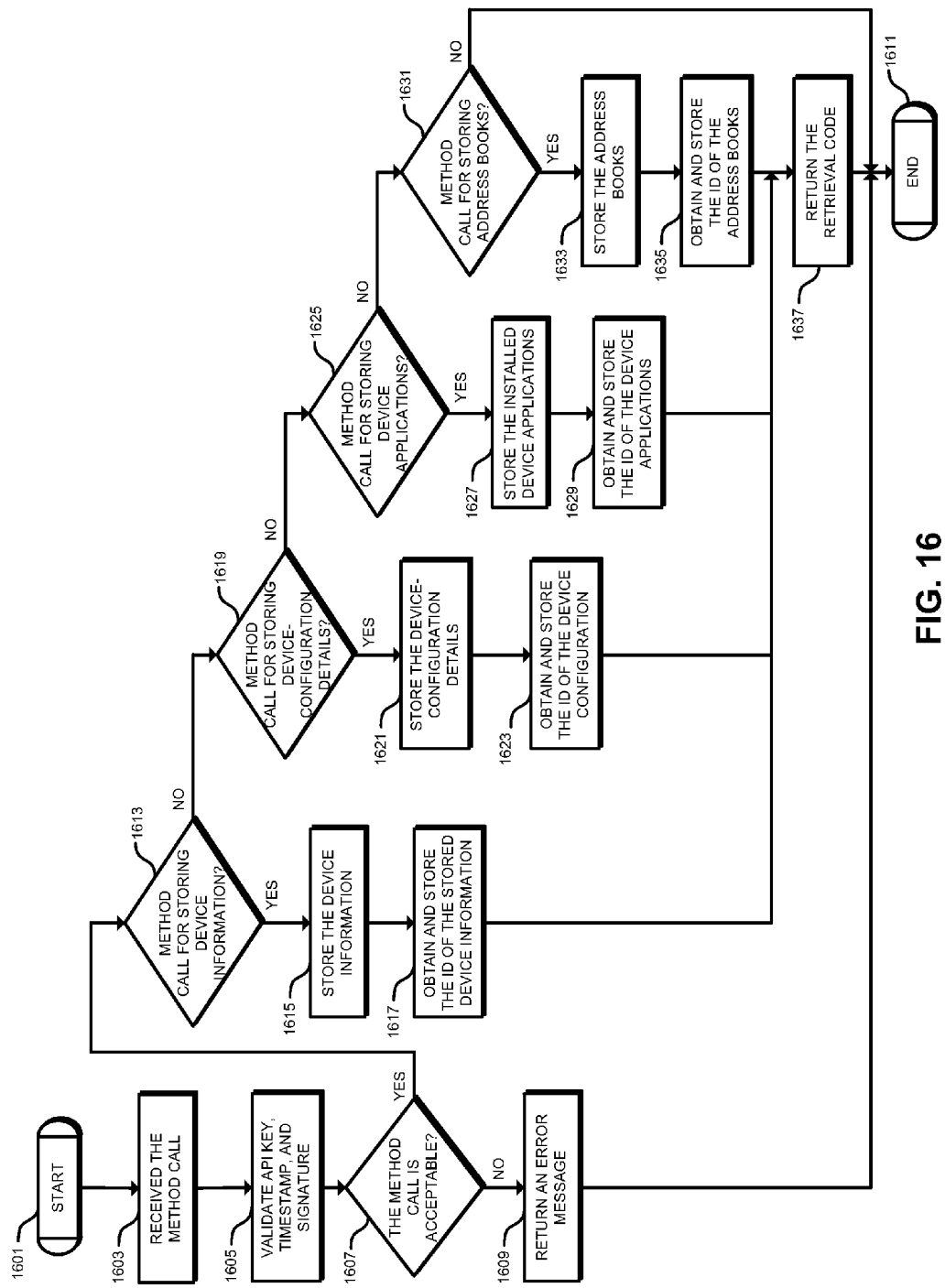
FIG. 16 illustrates an example embodiment of an operational flow for device replacement.

FIG. 16 illustrates an example embodiment of an operational flow for device replacement. The flow starts in block 1601 and then moves to block 1603, where a method call is received (e.g., by a provisioning service from a previously-provisioned device). Next, in block 1605, an API key, a timestamp, and a signature of the function call are validated. The flow then moves to block 1607, where it is determined if the method call is acceptable. If not (block 1607=NO), then the flow moves to block 1609, where an error message is returned, and then the flow moves to block 1611. If it is determined that the method call is acceptable (block 1607=YES), then the flow moves to block 1613.

In block 1616 it is determined if the method call includes a request to store device information. If not (block 1613=NO), then the flow moves to block 1619. If yes (block 1613=YES), then the flow moves to block 1615. In block 1615, the device information is stored. Next, in block 1617, an identifier (ID) of the device information is also obtained (e.g., assigned, generated) and stored. The flow then moves to block 1637.

In block 1619 it is determined if the method call includes a request to store device-configuration details. If not (block 1619=NO), then the flow moves to block 1625. If yes (block 1619=YES), then the flow moves to block 1621. In block 1621, the device-configuration details are stored. Next, in block 1623, an identifier (ID) of the device-configuration details is also obtained (e.g., assigned, generated) and stored. The flow then moves to block 1637.

In block 1625 it is determined if the method call includes a request to store device applications. If not (block 1625=NO), then the flow moves to block 1631. If yes (block 1625=YES), then the flow moves to block 1627. In block 1627, the device applications are stored. Next, in block 1629, an identifier (ID) of the device applications is also obtained (e.g., assigned, generated) and stored. The flow then moves to block 1637.

In block 1631 it is determined if the method call includes a request to store address books. If not (block 1631=NO), then the flow moves to block 1611. If yes (block 1631=YES), then the flow moves to block 1633. In block 1633, the address books are stored. Next, in block 1635, an identifier (ID) of the address books is also obtained (e.g., assigned, generated) and stored. The flow then moves to block 1637.

In block 1637, a revival code is generated based on the ID of the address books, the ID of the device applications, the ID of the device-configuration details, or the ID of the device information, and then the retrieval code is returned. Finally, the flow ends in block 1611.

Figure 17:
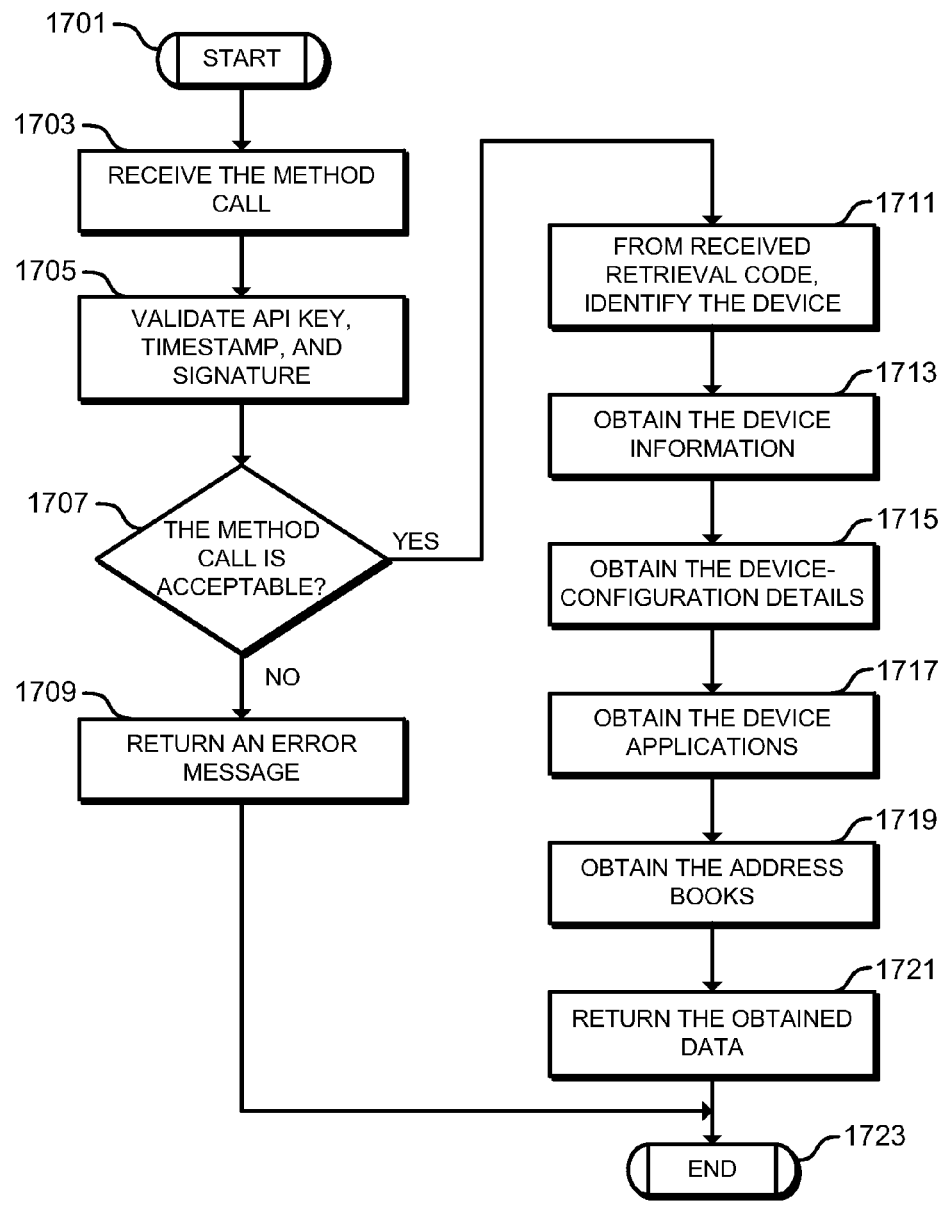
FIG. 17 illustrates an example embodiment of an operational flow for device replacement.

FIG. 17 illustrates an example embodiment of an operational flow for device replacement. The flow starts in block 1701 and then moves to block 1703. In block 1703, a method call, which includes a retrieval code, is received, and in block 1705 an API key, a timestamp, and a signature of the method call are validated. In block 1707 it is determined if the method call is acceptable. If not (block 1707=NO), then the flow proceeds to block 1709, where an error message is generated and returned, and then the flow proceeds to block 1723, where the flow ends. If in block 1707 the method call is determined to be acceptable (block 1707=YES), then the flow moves to block 1711.

In block 1711, a previously-provisioned device is identified based on the retrieval code. Following, in block 1713, the device information for the identified previously-provisioned device is obtained (e.g., retrieved from storage). Next, in block 1715, the device-configuration details for the identified previously-provisioned device are obtained. The flow then moves to block 1717, where the device applications for the identified previously-provisioned device are obtained. The flow then proceeds to block 1719, where the address books for the identified previously-provisioned device are obtained. Next, in block 1721, the device information, the device-configuration details, the device applications, and the address books are returned. Finally, the flow ends in block 1723.

Figure 18:
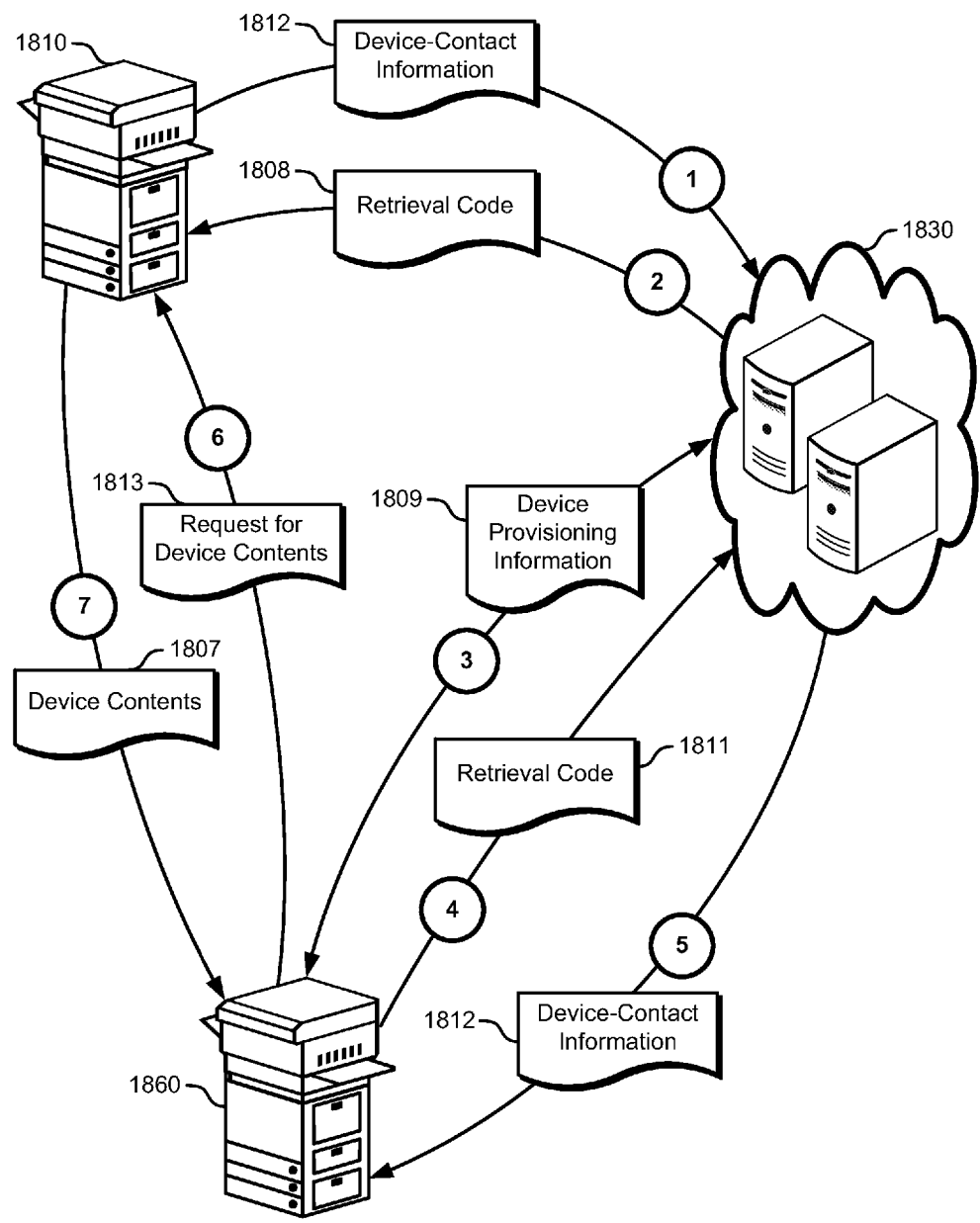
FIG. 18 illustrates an example embodiment of a system for device replacement and an example embodiment of the flow of information in the system.

FIG. 18 illustrates an example embodiment of a system for device replacement and an example embodiment of the flow of information in the system. The system includes a previously-provisioned device 1810 (e.g., a device that has been registered and activated), a provisioning service 1830, and a new device 1860. In stage 1, the previously-provisioned device 1810 sends its device contact information 1812 (e.g., URL, IP address) to the provisioning service 1830. The provisioning service 1830 stores the received device contact information 1812 and generates a retrieval code 1808, which is associated with the device contact information 1812. In stage 2, the provisioning service 1830 sends the retrieval code 1808 to the previously-provisioned device 1810. In stage 3, the new device 1860 and the provisioning service 1830 exchange device provisioning information 1809 (e.g., a token, an activation code, a request, a device ID, an API key) to provision (e.g., register and activate) the new device 1860. Then, in stage 4, the new device obtains the retrieval code 1811 (e.g., by means of manual entry at a user interface, of a card reader, of a scanner, of a network connection) and sends the retrieval code 1811 to the provisioning service 1830. In stage 5, the provisioning service 1830 identifies the device contact information 1812 based on the retrieval code 1811 and sends the device contact information 1812 to the new device 1860.

In stage 6, the new device 1860 uses the received device contact information 1812 to send a request for device contents 1813, which may include the retrieval code 1811, to the previously-provisioned device 1810. In response, in stage 7 the previously-provisioned device 1810 sends its device contents 1807 to the new device 1860. The new device 1860 then stores the device contents 1807, configures itself according to any received configuration details, and activates any received applications.

Figure 19:
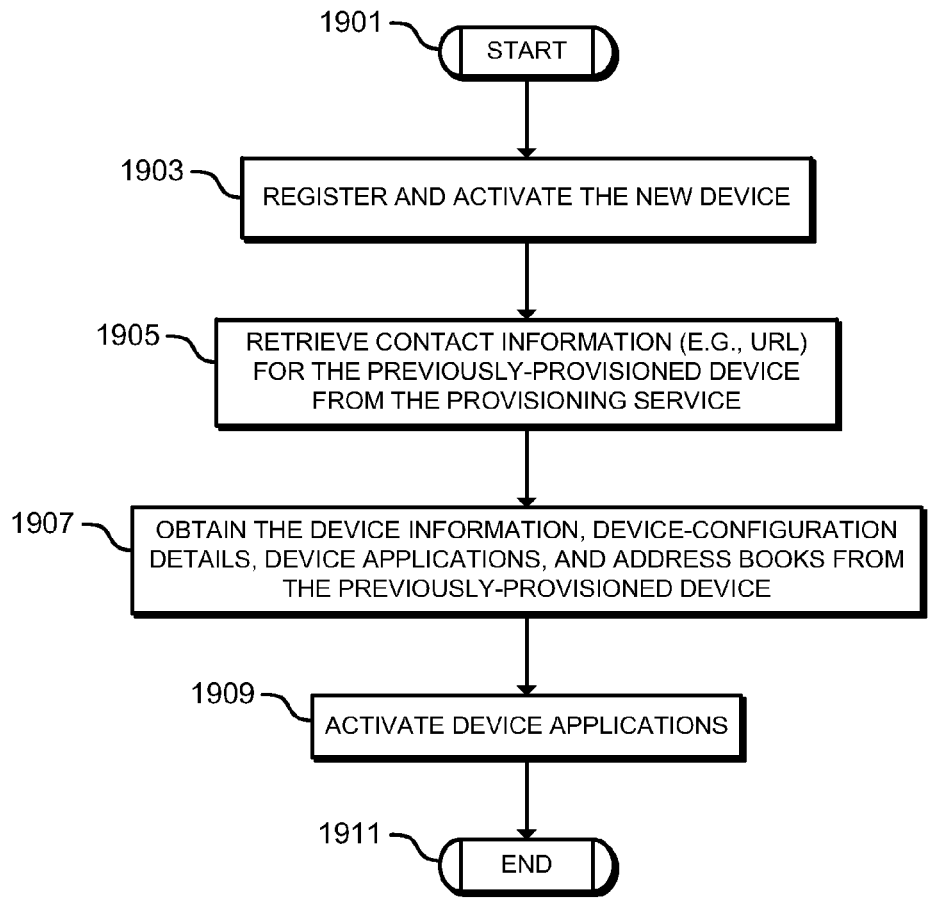
FIG. 19 illustrates an example embodiment of an operational flow for device replacement.

FIG. 19 illustrates an example embodiment of an operational flow for device replacement. The flow starts in block 1901, and then, in block 1903, a new device is registered and activated (e.g., according to FIG. 5, 7, or 9). Next, in block 1905, the contact information (e.g., URL, IP address, network address) for the previously-provisioned device is obtained from a provisioning service, for example by using a retrieval code. The flow then moves to block 1907 where, using the contact information, the new device obtains one or more of the following from the previously-provisioned device: the device information, the device-configuration details, the device applications, and the address books. Finally, in block 1909 the device applications are activated, and the flow ends in block 1911.

Figure 20:
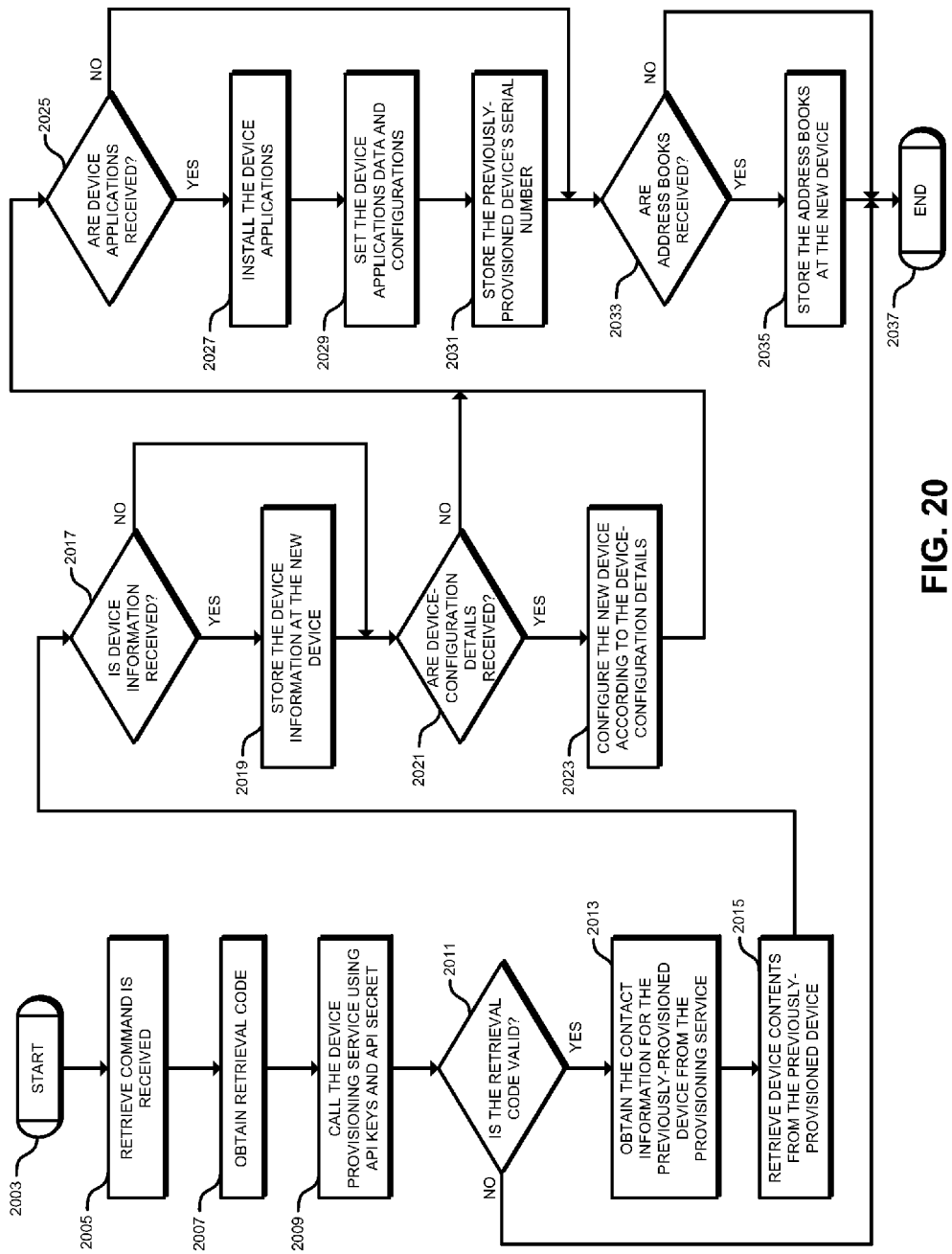
FIG. 20 illustrates an example embodiment of an operational flow for device replacement.

FIG. 20 illustrates an example embodiment of an operational flow for device replacement. The flow starts in block 2003, and then moves to block 2005, where a retrieve command is received by a new device that has been provisioned by a provisioning service. Next, in block 2007, the new device obtains a retrieval code (e.g., by means of manual entry on a user interface, by means of a card reader, by means of a network connection, by means of a scanner). Following, in block 2009, the new device calls the provisioning service using the API keys and the API secret, and the new device sends the provisioning service the retrieval code.

In block 2011, it is determined if the retrieval code is valid. If not (block 2011=NO), then the new device is notified of the error and the flow moves to block 2037. If the retrieval code is determined to be valid (block 2011=YES), then the flow proceeds to block 2013, where the contact information for the previously-provisioned device is obtained from the provisioning service. Following, in block 2015 the new device uses the contact information to obtain the device contents from the previously-provisioned device.

Next, in block 2017, it is determined if the device contents include device information. If not (block 2017=NO), then the flow moves to block 2021. If yes (block 2017=YES), then the flow moves to block 2019, where the new device stores the device information. The flow then proceeds to block 2021.

In block 2021, it is determined if the device contents include device information. If not (block 2021=NO), then the flow moves to block 2025. If yes (block 2021=YES), then the flow moves to block 2023, where the new device stores the device-configuration details and configures itself according to the device-configuration details. The flow then proceeds to block 2025.

In block 2025, it is determined if the device contents include device applications. If not (block 2025=NO), then the flow moves to block 2033. If yes (block 2025=YES), then the flow moves to block 2027, where the new device installs the device applications. The flow then proceeds to block 2029. In block 2029, the new device sets the data for the device applications and configures the device applications. Following, in block 2031, the new device stores the previously-provisioned device's serial number, and then the flow moves to block 2033.

In block 2033, it is determined if the device data includes device applications. If not (block 2033=NO), then the flow moves to block 2037. If yes (block 2033=YES), then the flow moves to block 2035, where the new device stores the address books. The flow then proceeds to block 2037. Finally, in block 2037, the flow ends.

Figure 21A:
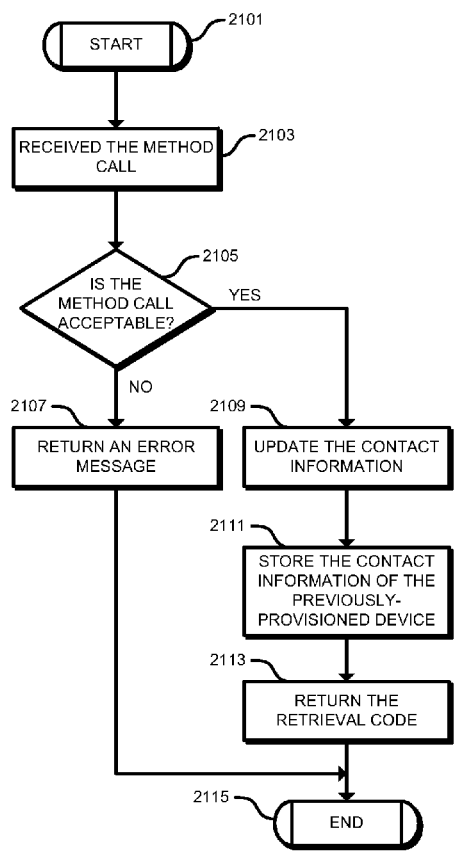
FIG. 21A and FIG. 21B illustrate example embodiments of operational flows for device replacement.
Figure 21B:
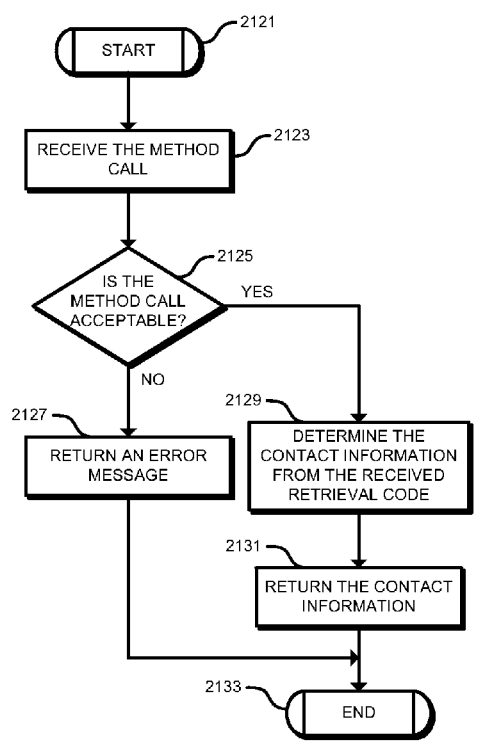

FIG. 21A and FIG. 21B illustrate example embodiments of systems for device replacement. The flow in FIG. 21A starts in block 2101, and then in block 2103 a method call for replacing a previously-provisioned device is received (e.g., by a provisioning service). Next, in block 2105, it is determined if the method call is acceptable (e.g., if the API key, the timestamp, and the signature are valid). If not (block 2105=NO), then the flow proceeds to block 2107, where an error message is returned, then to block 2115, where the flow ends. If the method call is acceptable (block 2105=YES), then the flow proceeds to block 2109.

In block 2109, the provisioning service's record of the contact information of the previously-provisioned device is updated. Next, in block 2111, the provisioning service stores the contact information of the previously-provisioned device and generates a retrieval code that is associated with the contact information. The flow then moves to block 2113, where the retrieval code is returned. Finally, the flow ends in block 2115.

The flow in FIG. 21B starts in block 2121, and then moves to block 2123, where a method call that includes a retrieval code is received. Next, in block 2125, it is determined if the method call is acceptable (e.g., if the API key, the timestamp, the signature, and the retrieval code are valid). If not (block 2125=NO), then the flow moves to block 2127, where an error message is returned, and then to block 2133, where the flow ends. If the method call is acceptable (block 2125=YES), then the flow moves to block 2129. In block 2129, the contact information of the previously-provisioned device is determined based on the received retrieval code. Following, in block 2131 the contact information is returned, and then the flow ends in block 2133.

Figure 22A:
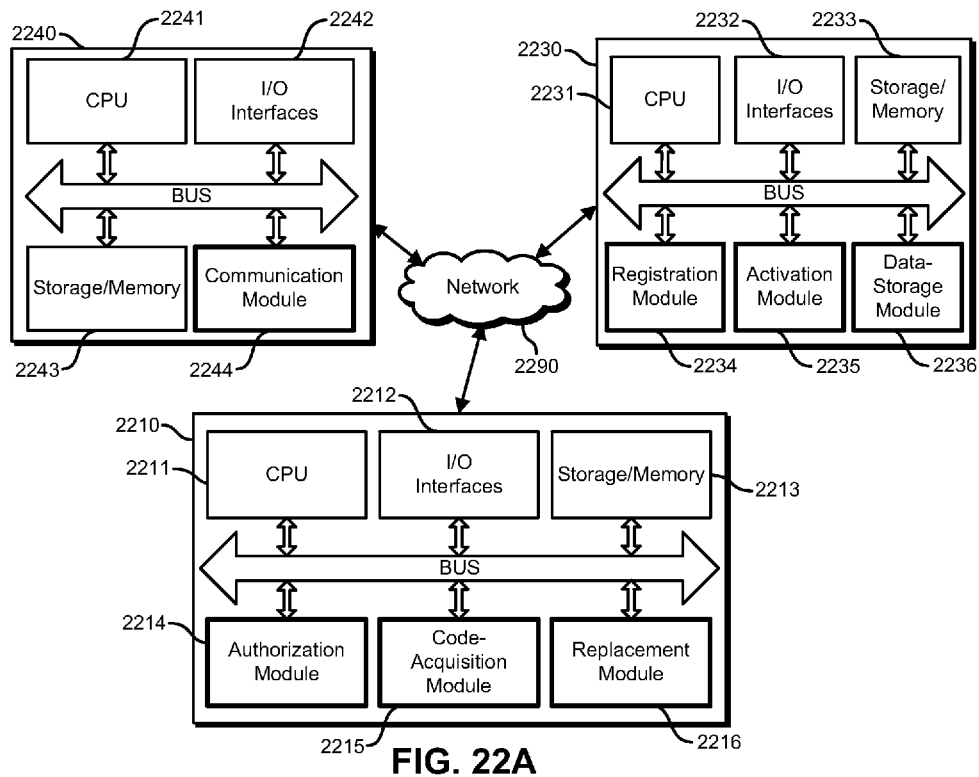
FIG. 22A and FIG. 22B illustrate example embodiments of systems for device provisioning.
Figure 22B:
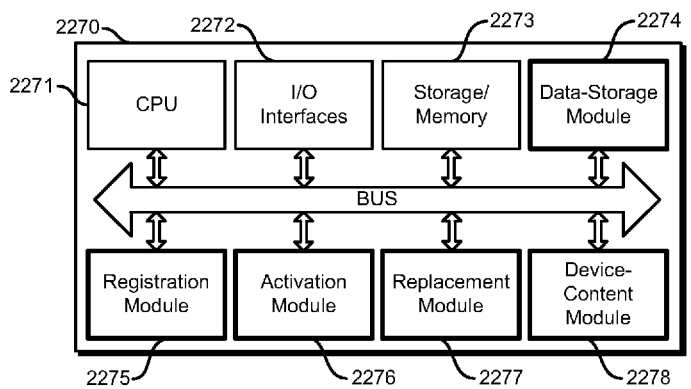

FIG. 22A and FIG. 22B illustrate example embodiments of systems for device provisioning. The system of FIG. 22A includes a user-associated device 2240, a provisioning device 2230, and a candidate device 2210, which communicate by means of one or more networks 2290. The candidate device 2210 includes one or more processors (CPU) 2211, one or more I/O interfaces 2212, and storage/memory 2213. The CPU 2211 includes one or more central processing units, which include microprocessors (e.g., a single core microprocessor, a multi-core microprocessor) or other circuits, and the CPU 2211 is configured to read and perform computer-executable instructions, such as instructions in storage or in memory (e.g., in modules that are stored in storage or memory). The computer-executable instructions may include those for the performance of at least some of the operations described herein. The one or more I/O interfaces 2212 include communication interfaces to input and output devices, which may include a keyboard, a display, a mouse, a printing device, a touch screen, a light pen, an optical-storage device, a scanner, a microphone, a camera, a drive, a card reader, and a network (either wired or wireless).

The storage/memory 2213 includes one or more computer-readable or computer-writable media, for example a computer-readable storage medium. A computer-readable storage medium, in contrast to a mere transitory, propagating signal, includes a tangible article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage/memory 2213 is configured to store computer-readable data or computer-executable instructions. The components of the candidate device 2210 communicate via a bus.

The candidate device 2210 also includes a registration module 2214, an authorization module 2215, and a replacement module 2216. In some embodiments, the devices in the system include additional or fewer modules, the modules are combined into fewer modules, or the modules are divided into more modules. Modules include logic, computer-readable data, or computer-executable instructions, and may be implemented in software (e.g., Assembly, C, C++, C#, Java, BASIC, Perl, Visual Basic), hardware (e.g., customized circuitry), and a combination of software and hardware. Though the computing device or computing devices that execute a module perform the operations, for purposes of description a module may be described as performing one or more operations.

The authorization module 2214 includes computer-readable instructions that, when executed by one or more computing devices, cause the one or more computing devices (e.g., the candidate device 2210) to send user credentials to an identity provider, to receive one or more tokens from the identity provider, and to send a registration request to the provisioning device 2230. The code-acquisition module 2215 includes computer-readable instructions that, when executed by one or more computing devices, cause the one or more computing devices to obtain a code (e.g., an activation code, a retrieval code), for example by means of a user interface, a network (e.g., WiFi network, an NFC network, a Bluetooth network), and another input device (e.g., card reader, a biometric detector, a camera). The service-communication module 2216 includes computer-readable instructions that, when executed by one or more computing devices, cause the one or more computing devices to send one or more of the following to the provisioning device 2230: a provisioning request, a device identifier, a token, an activation request, and a code (e.g., an activation code, a retrieval code). The service-communication module 2216 also includes computer-readable instructions that, when executed by one or more computing devices, cause the one or more computing devices to receive one or more API keys, an API secret, or both from the provisioning device 2230.

The provisioning device 2230 includes one or more processors (CPU) 2231, one or more I/O interfaces 2232, storage/memory 2233, a registration module 2234, an activation module 2235, and a data-storage module 2236. The registration module 2234 includes computer-readable instructions that, when executed by one or more computing devices, cause the one or more computing devices (e.g., the provisioning device 2230) to register a candidate device (which may include receiving a request, a device identifier, and a token), to generate an activation code, and send the activation code to a user-associated device. The activation module 2235 includes computer-readable instructions that, when executed by one or more computing devices, cause the one or more computing devices to activate a candidate device, which may include receiving and validating an activation code and sending one or more API keys and an API secret to the candidate device. Also, the data storage module 2236 includes computer-readable instructions that, when executed by one or more computing devices, cause the one or more computing devices to store and associate the following for one or more candidate devices: device information, tokens, activation codes, API keys, and API secrets.

The user-associated device 2240 includes one or more processors (CPU) 2241, one or more I/O interfaces 2242, storage/memory 2243, and a communication module 2244. The communication module includes computer-readable instructions that, when executed by one or more computing devices, cause the one or more computing devices (e.g., the user-associated device) to obtain an activation code from the provisioning device 2230. Additionally, the instructions cause the one or more computing devices to perform one or more of the following: display the activation code for a user, send the activation code to the candidate device 2210 (e.g., by means of wireless communication), and transfer the activation code to another tangible medium (e.g., a printout, a USB drive, a smart card).

The system of FIG. 22B includes a provisioning device 2270. The provisioning device 2270 includes one or more processors (CPU) 2271, one or more I/O interfaces 2272, storage/memory 2273, a data-storage module 2274, a registration module 2275, an activation module 2276, a replacement module 2277, and a device-content module 2278. The replacement module 2277 includes computer-readable instructions that, when executed by one or more computing devices, cause the one or more computing devices to generate a retrieval code and respond to receipts of retrieval codes (e.g., by sending device contents, by sending device-contact information). The device-content module 2278 includes computer-readable instructions that, when executed by one or more computing devices, cause the one or more computing devices to obtain and store device contents, obtain and store device-contact information, or both.

The above-described devices, systems, and methods can be implemented by providing one or more computer-readable media that contain computer-executable instructions for realizing the above-described operations to one or more computing devices that are configured to read and execute the computer-executable instructions. Thus, the systems or devices perform the operations of the above-described embodiments when executing the computer-executable instructions. Also, an operating system on the one or more systems or devices may implement at least some of the operations of the above-described embodiments. Thus, the computer-executable instructions or the one or more computer-readable media that contain the computer-executable instructions constitute an embodiment.

Any applicable computer-readable medium (e.g., a magnetic disk (including a floppy disk, a hard disk), an optical disc (including a CD, a DVD, a Blu-ray disc), a magneto-optical disk, a magnetic tape, and semiconductor memory (including flash memory, DRAM, SRAM, a solid state drive, EPROM, EEPROM)) can be employed as a computer-readable medium for the computer-executable instructions. The computer-executable instructions may be stored on a computer-readable storage medium that is provided on a function-extension board inserted into a device or on a function-extension unit connected to the device, and a CPU provided on the function-extension board or unit may implement at least some of the operations of the above-described embodiments.

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

What is claimed is:

1. A method for provisioning a device, the method comprising:
    at a registration device, receiving authentication information from a user interface, wherein the authentication information corresponds to a user;
    sending the authentication information from the registration device to an identity provider device;
    receiving a token at the registration device from the identify provider device, wherein the token corresponds to the user;
    sending the token, new device information, and a first provisioning request from the registration device to a provisioning device;
    at a user interface of the new device, receiving an activation code;
    sending the activation code and the token from the user interface of the new device to the provisioning device;
    at the new device, receiving a key from the provisioning device, wherein the key is associated with a device identifier of the new device;
    signing the new device information, a new device configuration, new device applications, and new device data using the key and an API secret, thereby generating signed device information; and
    sending the device identifier and the signed device information from the new device to the provisioning device.

2. The method of claim 1, further comprising:
    generating the activation code based on the token; and
    sending the activation code and the token to the registration device.

3. The method of claim 1, wherein the new device information includes one or more of a device name, a device location, a device IP address, a device model, a device serial number, and a device manufacturer.

4. The method of claim 1, wherein the registration device is the new device.

5. The method of claim 1, wherein the activation code has a predetermined life span, and wherein the method further comprises:
    determining if the provisioning device has received the activation code from the new device before the end of the predetermined life span of the activation code.

6. The method of claim 1, further comprising,
    at the provisioning device,
        receiving a second provisioning request for the new device,
        generating a second activation code for the new device,
        sending the second activation code for the new device to a computing device, and
        invalidating the activation code associated with the first provisioning request.

7. The method of claim 1, further comprising sending the activation code and the token from the provisioning device to the registration device.

8. One or more computer-readable storage media storing instructions that, when executed by one or more computing devices, cause the one or more computing devices to perform operations comprising:
- at a registration device, receiving authentication information from a user interface, wherein the authentication information corresponds to a user;
- sending the authentication information from the registration device to an identity provider device;
- receiving a token at the registration device from the identify provider device, wherein the token corresponds to the user;
- sending the token, new device information of a new device, and a first provisioning request from the registration device to a provisioning service;
- at the provisioning service,
  - generating a first activation code for the new device,
  - receiving a second provisioning request for the new device,
  - generating a second activation code for the new device,
  - sending the second activation code for the new device to a computing device, and
  - invalidating the first activation code for the new device;
- at a user interface of the new device, receiving the second activation code;
- sending the second activation code and the token from the user interface of the new device to the provisioning service; and
- at the new device, receiving a key from the provisioning service, wherein the key is associated with a device identifier of the new device.

9. The one or more computer-readable storage media of claim 8, wherein the user interface of the new device is displayed on the registration device.

10. The one or more computer-readable storage media of claim 8, wherein the device identifier of the new device is a new device tenant ID, and
- wherein the operations further comprise sending the new device information, a new device tenant ID, a new device configuration, new device applications, and new device data from the new device to the provisioning service.

11. The one or more computer-readable storage media of claim 10, wherein the key is an API key, and
- wherein the operations further comprise signing the new device information, the new device configuration, the new device applications, and the new device data using the API key and an API secret.

12. The one or more computer-readable storage media of claim 10, wherein the operations further comprise:
- sending the new device tenant ID from a replacement device to the provisioning service;
- sending the new device information, the new device configuration, the new device applications, and the new device data from the provisioning service to the replacement device; and
- configuring the replacement device according to the new device information, the new device configuration, the new device applications, and the new device data.

13. A system for provisioning a device, the system comprising:
- one or more computer-readable media;
- one or more communication interfaces; and
- one or more processors that are configured to cause the system to
  - receive authentication information from a user interface at a registration device, wherein the authentication information corresponds to a user;
  - send the authentication information from the registration device to an identity provider device;
  - receive a token at the registration device from the identify provider device, wherein the token corresponds to the user;
  - send the token, new device information, and a provisioning request from the registration device to a provisioning service;
  - at a user interface of the new device, receive an activation code;
  - send the activation code from the user interface of the new device to the provisioning device;
  - at the new device, receive a key from the provisioning device, wherein the key is associated with a device identifier of the new device;
  - sign the new device information, a new device configuration, new device applications, and new device data using the key and an API secret, thereby generating signed device information; and
  - send the new device identifier and the signed device information from the new device to the provisioning device.

* * * * *